(12) United States Patent
Trainor et al.

(10) Patent No.: US 6,296,674 B1
(45) Date of Patent: *Oct. 2, 2001

(54) CANDLE WAX STABILIZED WITH RED-SHIFT BENZOTRIAZOLES

(75) Inventors: Kevin Trainor, Brewster, NY (US); Walid Al-Akhdar; James Lee Hyun, both of Danbury, CT (US); Ramanathan Ravichandran, Nanuet, NY (US); Joseph Suhadolnik, Yorktown Heights, NY (US); Andrea Smith, Wingdale, NY (US); Mervin Wood, Poughquag, NY (US)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/495,496

(22) Filed: Feb. 1, 2000

(51) Int. Cl.⁷ .................................................. C11C 5/00
(52) U.S. Cl. ............................................................ 44/275
(58) Field of Search .............................. 44/275; 431/288

(56) References Cited

U.S. PATENT DOCUMENTS

| | | | |
|---|---|---|---|
| 3,004,896 | * 10/1961 | Heller et al. | 252/589 |
| 3,386,938 | * 6/1968 | Finch | 524/475 |
| 3,530,084 | * 9/1970 | Potts | 260/28.5 |
| 4,379,721 | * 4/1983 | Qualitz et al. | 106/21 |
| 4,616,051 | * 10/1986 | Paolino | 524/102 |
| 5,879,694 | 3/1999 | Morrison et al. | 424/405 |
| 5,964,905 | 10/1999 | Camp et al. | 44/275 |

FOREIGN PATENT DOCUMENTS

| | | |
|---|---|---|
| 0005922 | 12/1979 | (EP) . |
| 0133964 | 3/1985 | (EP) . |
| 0359488 | 3/1990 | (EP) . |
| 94/13736 | 6/1994 | (WO) . |

OTHER PUBLICATIONS

F.A. Ballentine et al, Inhibiting Color Fading of Dyed Candles with CYASORB® Light Absorbers, Cytec Industries Apr. 16, 1998.

R. van der Vennet, Antioxidants in Wax–Replacement of BHT, National Candle Association Technical Committee, Oct., 1994.

Ullmann's Encyclopedia of Industrial Chemistry, vol. A5, Candles, pp. 29–30, Date Unknown.

\* cited by examiner

*Primary Examiner*—Margaret Medley
*Assistant Examiner*—Cephia D. Toomer
(74) *Attorney, Agent, or Firm*—Luther A. R. Hall

(57) ABSTRACT

White, dyed, dipped, unscented and/or scented candle wax is effectively stabilized against discoloration and fading by the incorporation therein of a red-shifted benzotriazole either alone or in combination with a hindered amine and/or an antioxidant.

24 Claims, No Drawings

CANDLE WAX STABILIZED WITH RED-SHIFT BENZOTRIAZOLES

The instant invention pertains to white, dyed, dipped, unscented and/or scented candle wax which is effectively stabilized against discoloration and fading by the incorporation therein of a red-shifted benzotriazole either alone or in combination with a hindered amine.

BACKGROUND OF THE INVENTION

Candles have been known for many centuries going back to the eighth century B.C. The nature of candles is described in Ullmann's Encyclopedia of Industrial Chemistry, Volume A5 at pages 29–30 where it is seen that candles are made from paraffin, beeswax and stearin as basic materials, and where a host of additives may also be present.

It is not surprising that with candles and wax becoming increasingly more important attention was paid as to how to stabilize said materials. At the National Candle Association Meeting in Houston, 1994, R. van der Vennet presented a paper on "Antioxidants in Wax—Replacement of BHT" touting the use of Vitamin E (tocopherol) as an antioxidant to prevent the yellowing of wax when oxidized. WO 94/13736 describes the same invention.

EP 359,488 A3 and EP 133,964 B1 describe stabilized waxes used in cosmetics where the waxes are the same or similar to those used in candles.

EP 5,922 A1 describes lip cosmetics where the waxes are useful in lipsticks and are related to those useful in candles.

U.S. Pat. No. 5,879,694 describes in detail transparent gel candles both in composition and structure. The use of BHT as an antioxidant is mentioned.

At the National Candle Association Technical Meeting on Apr. 16, 1998, F. A. Ballentine et al., presented a paper entitled "Inhibiting Color Fading of Dyed Candles with CYASORB® Light Absorbers" in which the general theories of thermal oxidation and photodegradation are discussed along with data on the effect of light absorbers on color stability of dyed candle waxes. The light absorbers compared are 4-octyloxy-2-hydroxybenzophenone UV-531; 4-methoxy-2-hydroxybenzophenone UV-9; 2-(2-hydroxy-5-methylphenyl)-2H-benzotriazole UV-5365; 2-(2-hydroxy-5-tert-octylphenyl)-2H-benzotriazole UV-5411 and 2-(2-hydroxy-3,5-di-tert-amylphenyl)-2H-benzotriazole V-2337).

U.S. Pat. No. 5,964,905 teaches dyed and scented candle gels containing triblock copolymers and a hydrocarbon oil of high flash point. This reference teaches that a light (UV) absorber may be used to improve the shelf stability of the candle color when exposed to visible or ultraviolet light. Two preferred absorbers are ethylhexyl p-methoxycinnamate (PARSOL® MCX, Roche) and 2-(2-hydroxy-5-tert-octylphenyl)-2H-benzotriazole (CYASORB® 5411, Cytec).

None of these references teach the superior performance provided when the red-shifted benzotriazoles are used in place of the conventional UV absorbers described in the U.S. 5,964,905 or in the Ballentine et al. paper discussed above.

OBJECTS OF THE INVENTION

One object of the invention is to provide for a white unscented or dyed and/or scented candle wax stabilized by a red-shifted benzotriazole UV absorber.

Another object of the invention is to provide for a white unscented or dyed and/or scented candle wax stabilized by a combination of a red-shifted benzotriazole UV absorber and a hindered amine.

DETAILED DISCLOSURE

The instant invention pertains to a composition which comprises (a) white, dyed, dipped, unscented and/or scented candle wax, and (b) an effective stabilizing amount of a benzotriazole of formula I, II, III or IV

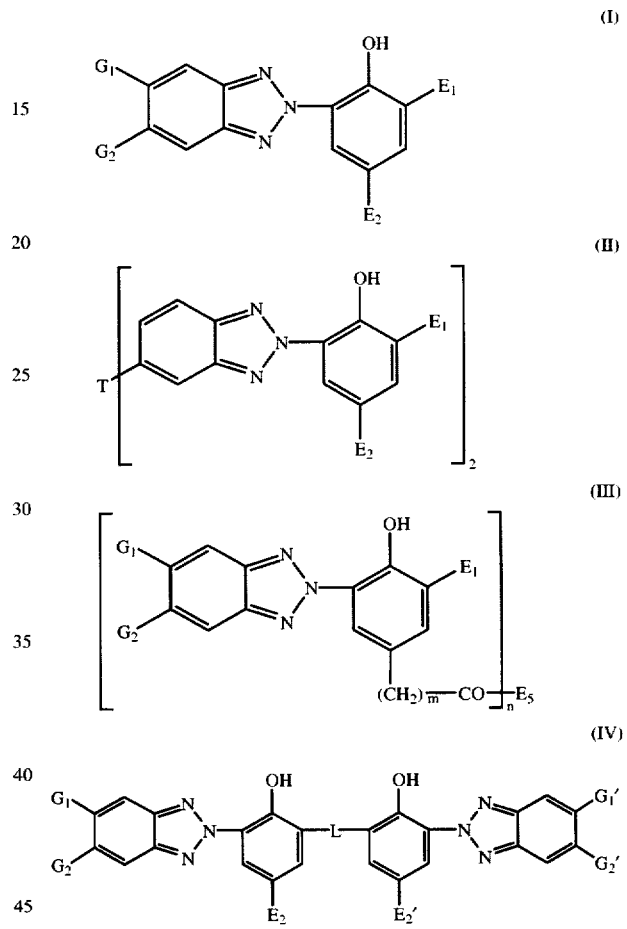

wherein $G_1$ and $G_1'$ are independently hydrogen or halogen, $G_2$ and $G_2'$ are independently halogen, nitro, cyano, perfluoroalkyl of 1 to 12 carbon atoms, —CO—$G_3$, —COO$G_3$, —CONH$G_3$, —CON($G_3$)$_2$, $E_3$SO—, $E_3$SO$_2$—, —P(O)($C_6H_5$)$_2$, —CO—$G_3$, —CO—NH—$G_3$, —CO—N($G_3$)$_2$, —N($G_3$)—CO—$G_3$,

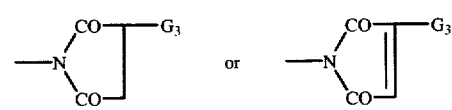

or one of $G_2$ or $G_2'$ is also hydrogen, $G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups; or $E_1$ is a group —$(CH_2)_m$—CO—$X_1$—$G_3$ where $X_1$ is —O—, —NH— or —$NG_3$—, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ and $E_2'$ are independently said alkyl of 1 to 24 carbon atoms or said alkenyl of 2 to 18 carbon atoms substituted by one or more —OH, —$OCOE_{11}$, —$OE_4$, —NCO, —$NH_2$, —$NHCOE_{11}$, —$NHE_4$ or —$N(E_4)_2$, or mixtures thereof, where $E_4$ is straight or branched chain alkyl of 1 to 24 carbon atoms; or said alkyl or said alkenyl interrupted by one or more —O—, —NH— or —$NE_4$— groups or mixtures thereof and which can be unsubstituted or substituted by one or more —OH, —$OE_4$ or —$NH_2$ groups or mixtures thereof;

n is 1 or 2, when n is 1, $E_5$ is $OE_6$ or $NE_7E_8$, or $E_5$ is —$PO(OE_{12})_2$, —$OSi(E_{11})_3$ or —OCO—$E_{11}$, or straight or branched chain $C_1$–$C_{24}$alkyl which is interrupted by —O—, —S— or —$NE_{11}$ and which can be unsubstituted or substituted by —OH or —OCO—$E_{11}$, $C_5$–$C_{12}$ cycloalkyl which is unsubstituted or substituted by —OH, straight chain or branched $C_2$–$C_{18}$alkenyl which is unsubstituted or substituted by —OH, $C_7$–$C_{15}$aralkyl, —$CH_2$—CHOH—$E_{13}$ or glycidyl, $E_6$ is hydrogen, straight or branched chain $C_1$–$C_{24}$alkyl which is unsubstituted or substituted by one or more OH, $OE_4$ or $NH_2$ groups, or —$OE_6$ is —$(OCH_2CH_2)_wOH$ or —$(OCH_2CH_2)_wOE_{21}$ where w is 1 to 12 and $E_{21}$ is alkyl of 1 to 12 carbon atoms, $E_7$ and $E_8$ are independently hydrogen, alkyl of 1 to 18 carbon atoms, straight or branched chain $C_3$–$C_{18}$alkyl which is interrupted by —O—, —S— or —$NE_{11}$—, $C_5$–$C_{12}$cycloalkyl, $C_6$–$C_{14}$aryl or $C_{1-3}$hydroxylalkyl, or $E_7$ and $E_8$ together with the N atom are a pyrrolidine, piperidine, piperazine or morpholine ring, $E_5$ is —X—$(Z)_p$—Y—$E_{15}$ wherein X is —O— or —$N(E_{16})$—, Y is —O— or —$N(E_{17})$—, Z is $C_2$–$C_{12}$-alkylene, $C_4$–$C_{12}$-alkylene interrupted by one to three nitrogen atoms, oxygen atoms or a mixture thereof, or is $C_3$–$C_{12}$-alkylene, butenylene, butynylene, cyclohexylene or phenylene, each substituted by a hydroxyl group, m is zero, 1 or 2, p is 1, or p is also zero when X and Y are —$N(E_{16})$— and —$N(E_{17})$—, respectively, $E_{15}$ is a group —CO—C($E_{18}$)=C(H)$E_{19}$ or, when Y is —$N(E_{17})$—, forms together with $E_{17}$ a group —CO—CH=CH—CO—, wherein $E_{18}$ is hydrogen or methyl, and $E_{19}$ is hydrogen, methyl or —CO—X—$E_{20}$, wherein $E_{20}$ is hydrogen, $C_1$–$C_{12}$-alkyl or a group of the formula

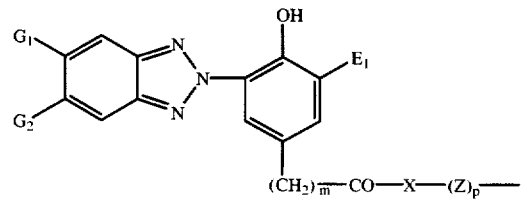

wherein the symbols $E_1$, $G_2$, X, Z, m and p have the meanings defined above, and $E_{16}$ and $E_{17}$ independently of one another are hydrogen, $C_1$–$C_{12}$-alkyl, $C_3$–$C_{12}$-alkyl interrupted by 1 to 3 oxygen atoms, or is cyclohexyl or $C_7$–$C_{15}$aralkyl, and $E_{16}$ together with $E_{17}$ in the case where Z is ethylene, also forms ethylene, when n is 2, one of $G_2$ can also be hydrogen, $E_5$ is one of divalent radicals —O—$E_9$—O— or —$N(E_{11})$—$E_{10}$—$N(E_{11})$—, $E_9$ is $C_2$–$C_8$alkylene, $C_4$–$C_8$alkenylene, $C_4$alkynylene, cyclohexylene, straight or branched chain $C_4$–$C_{10}$alkylene which is interrupted by —O— or by —$CH_2$—CHOH—$CH_2$—O—$E_{14}$—O—$CH_2$—CHOH—$CH_2$—, $E_{10}$ being straight or branched chain $C_2$–$C_{12}$alkylene which may be interrupted by —O—, cyclohexylene, or

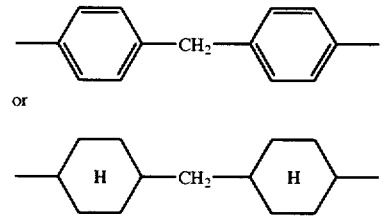

or $E_{10}$ and $E_{11}$ with the two nitrogen atoms form a piperazine ring, $E_{14}$ is straight or branched chain $C_2$–$C_8$alkylene, straight or branched chain $C_4$–$C_{10}$alkylene which is interrupted by —O—, cycloalkylene, arylene or

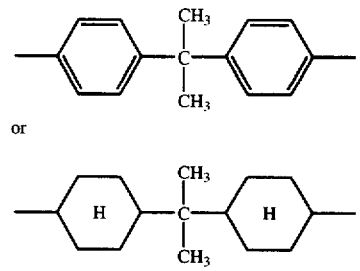

where $E_7$ and $E_8$ are independently hydrogen, alkyl of 1 to 18 carbon atoms or $E_7$ and $E_8$ together are alkylene of 4 to 6 carbon atoms, 3-oxapentamethylene, 3-iminopentamethylene or 3-methyliminopentamethylene, $E_{11}$ is hydrogen, straight or branched chain $C_1$–$C_{18}$alkyl, $C_5$–$C_{12}$cycloalkyl, straight or branched chain $C_2$–$C_{18}$alkenyl, $C_6$–$C_{14}$aryl or $C_7$–$C_{15}$aralkyl, $E_{12}$ is straight or branched chain $C_1$–$C_{18}$alkyl, straight or branched chain $C_3$–$C_{18}$alkenyl, $C_5$–$C_{10}$cycloalkyl, $C_6$–$C_{16}$aryl or $C_7$–$C_{15}$aralkyl, $E_{13}$ is H, straight chain or branched $C_1$–$C_{18}$alkyl which is substituted by —$PO(OR_{12})_2$, phenyl which is unsubstituted or substituted by OH, $C_7$–$C_{15}$aralkyl or —$CH_2OE_{12}$, $E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, L is alkylene of 1 to 12 carbon atoms, alkylidene of 2 to 12 carbon atoms, benzylidene, p-xylylene, α,α,α',α'-tetramethyl-m-xylylene or cycloalkylidene, and T is —SO—, —SO$_2$—, —SO—E—SO—, —SO$_2$—E—SO$_2$—, —CO—, —CO—CO—, —CO—CH$_2$—CO—, —CO—E—CO—, —COO—E—OCO— or —CO—NG$_5$—E—NG$_5$—CO—, where E is alkylene of 2 to 12 carbon atoms, cycloalkylene of 5 to 12 carbon atoms, or alkylene interrupted or terminated by cyclohexylene of 8 to 12 carbon atoms; and $G_5$ is $G_3$ or hydrogen.

An effective amount of red-shifted benzotriazole alone or in combination with other UV absorbers in the candle wax is 0.01 to 10% by weight, preferably 0.1 to 2% by weight; and most preferably 0.1 to 0.5% by weight based on the wax.

Preferably, the red-shifted benzotriazole is a compound of formula I

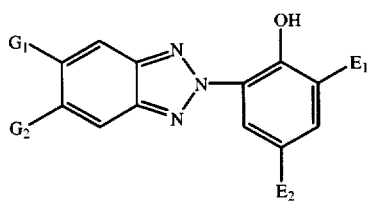

(I)

wherein $G_1$ is hydrogen, $G_2$ is cyano, CF$_3$—, chloro, fluoro, —CO—G$_3$ or E$_3$SO$_2$—, $G_3$ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms; or is a compound of formula I wherein, $G_1$ is hydrogen, $G_2$ is CF$_3$—, chloro, fluoro or E$_3$SO$_2$—, $E_1$ is hydrogen or straight or branched alkyl of 4 to 24 carbon atoms, $E_2$ is as defined above, and $E_3$ is straight or branched chain alkyl of 1 to 7 carbon atoms.

Preferably, the red-shifted benzotriazole is also a compound of formula IIIA

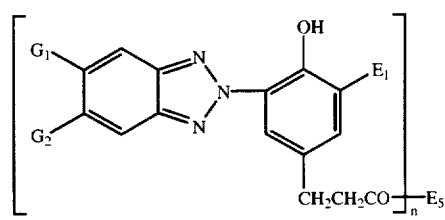

(IIIA)

wherein $G_1$ is hydrogen, $G_2$ is is CF$_3$—, chloro or fluoro, $E_1$ is hydrogen, straight or branched alkyl of 4 to 24 carbon atoms or phenylalkyl of 7 to 15 carbon atoms, $E_5$ is —OE$_6$ or —NE$_7$E$_8$, or $E_5$ is —X—(Z)$_p$—Y—E$_{15}$ wherein X is —O— or —N(E$_{16}$)—, Y is —O— or —N(E$_{17}$)—, Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is 0, 1, 2 or 3, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with E$_{17}$ a group —CO—CH=CH—CO—, wherein $E_{18}$ is hydrogen or methyl, and $E_{19}$ is hydrogen, methyl or —CO—X—E$_{20}$, wherein $E_{20}$ is hydrogen, C$_1$–C$_{12}$-alkyl or a group of the formula.

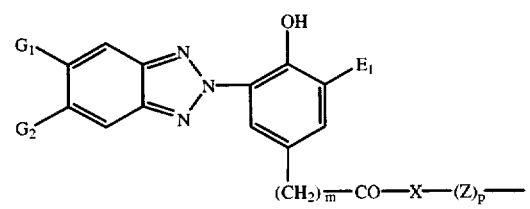

The preferred red-shifted benzotriazole is also a compound of formula IV (IV)

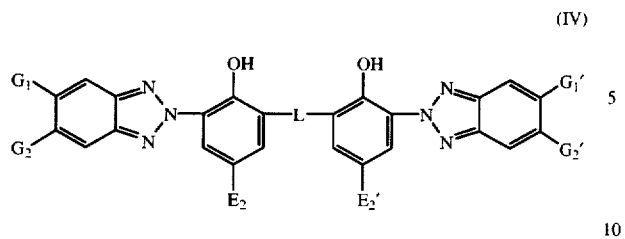

wherein $G_1$ and $G_1'$ are hydrogen, $G_2$ is $CF_3$ or chloro, $G_2'$ is hydrogen, $CF_3$ or chloro, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is alkylene of 1 to 12 carbon atoms, alkylidene of 2 to 12 carbon atoms, benzylidene, p-xylylene, $\alpha,\alpha,\alpha',\alpha'$-tetramethyl-m-xylylene or cycloalkylidene.

Most preferably, the red-shifted benzotriazole is a compound of formula I (I)

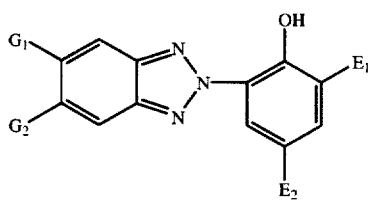

wherein $G_1$ is hydrogen, $G_2$ is $CF_3$— or chloro, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —$OCOE_{11}$, —$NH_2$ or —$NHCOE_{11}$, or mixtures thereof, or said alkyl or said alkenyl interrupted by one or more —O— and which can be unsubstituted or substituted by one or more —OH, or is a compound of formula I wherein, $G_1$ is hydrogen, $G_2$ is $CF_3$— or chloro, $E_1$ is hydrogen, straight or branched alkyl of 4 to 24 carbon atoms or phenylalkyl of 7 to 15 carbon atoms, and $E_2$ is as defined above.

Also, the most preferred red-shifted benzotriazole is a compound of formula IIIA (IIIA)

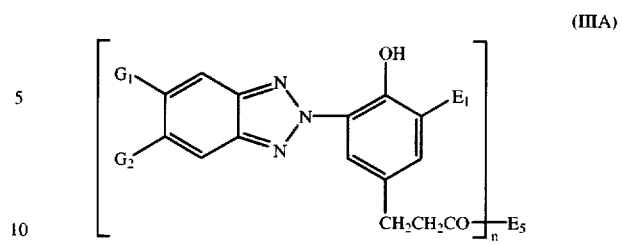

wherein $G_1$ is hydrogen, $G_2$ is $CF_3$— or chloro, $E_1$ is hydrogen, straight or branched alkyl of 4 to 24 carbon atoms or phenylalkyl of 7 to 15 carbon atoms, $E_5$ is —$OE_6$ or —$NE_7E_8$ where $E_6$ is hydrogen, straight or branched chain $C_1$–$C_{24}$alkyl which is unsubstituted or substituted by one or more OH groups, or —$OE_6$ is —$(OCH_2CH_2)_wOH$ or —$(OCH_2CH_2)_wOE_{21}$ where w is 1 to 12 and $E_{21}$ is alkyl of 1 to 12 carbon atoms, and $E_7$ and $E_8$ are independently hydrogen, alkyl of 1 to 18 carbon atoms, straight or branched chain $C_3$–$C_{18}$alkyl which is interrupted by —O—, —S— or —$NE_{11}$—, $C_5$–$C_{12}$cycloalkyl, $C_6$–$C_{14}$aryl or $C_1$–$C_3$hydroxylalkyl, or $E_7$ and $E_8$ together with the N atom are a pyrrolidine, piperidine, piperazine or morpholine ring.

Also, most preferably, the red-shifted benzotriazole is a compound of formula IV (IV)

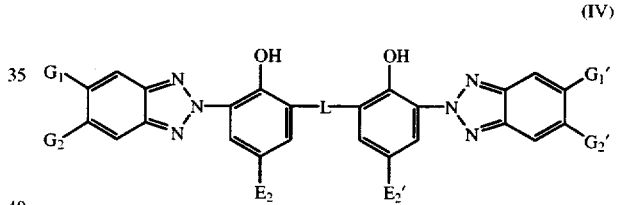

wherein $G_1$ and $G_1'$ are hydrogen, $G_2$ is $CF_3$ or chloro, $G_2'$ is hydrogen, $CF_3$ or chloro, wherein $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is methylene.

The red-shifted benzotriazole is particularly (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(d) 2,2'-methylene-bis[6-(5-trifluoromethyl-2H-benzotriazol-2-yl)-4-tert-octyl-phenol];

(e) methylene-2-[4-tert-octyl-6-(2H-benzotriazol-2-yl)phenol]2'-[4-tert-octyl-6-(5-trifluoromethyl-2H-benzotriazol-2-yl)phenol];

(f) 3-(5-trifluoromethyl-2H-benzotriazol-2-yl)-5-tert-butyl-4-hydroxy-hydrocinnamic acid;

(g) methyl 3-(5-trifluoromethyl-2H-benzotriazol-2-yl)-5-tert-butyl-4-hydroxy-hydrocinnamate;

(h) isooctyl 3-(5-trifluoromethyl-2H-benzotriazol-2-yl)-5-tert-butyl-4-hydroxy-hydrocinnamate;

(i) 5-trifluoromethyl-2-[2-hydroxy-5-(3-hydroxypropyl)phenyl]-2H-benzotriazole;

(j) 5-trifluoromethyl-2-[2-hydroxy-5-(3-acryloyloxypropyl)phenyl]-2H-benzotriazole;

(k) 5-trifluoromethyl-2-[2-hydroxy-5-(3-methacryloyloxypropyl)phenyl]-2H-benzotriazole;

(l) 5-trifluoromethyl-2-[2-hydroxy-5-(3-acrylylaminopropyl)phenyl]-2H-benzotriazole;

(m) 5-trifluoromethyl-2-[2-hydroxy-5-(3-methacrylylaminopropyl)phenyl]-2H-benzotriazole;

(n) 5-trifluoromethyl-2-(2-hydroxy-3-α-cumyl-5-tert-butylphenyl)-2H-benzotriazole;

(o) 5-trifluoromethyl-2-(2-hydroxy-3-α-cumyl-5-nonylphenyl)-2H-benzotriazole;

(p) 5-trifluoromethyl-2-[2-hydroxy-3-α-cumyl-5-(2-hydroxyethyl)phenyl]-2H-benzotriazole;

(q) 5-trifluoromethyl-2-[2-hydroxy-3-α-cumyl-5-(3-hydroxypropyl)phenyl]-2H-benzotriazole;

(r) 5-trifluoromethyl-2-(2-hydroxy-3,5-ditert-amylphenyl)-2H-benzotriazole;

(s) 5-trifluoromethyl-2-(2-hydroxy-3,5-ditert-butylphenyl)-2H-benzotriazole;

(t) 5-trifluoromethyl-2-(2-hydroxy-3-dodecyl-5-methylphenyl)-2H-benzotriazole;

(u) 5-trifluoromethyl-2-[2-hydroxy-3-tert-butyl-5-(3-hydroxypropyl)phenyl]-2H-benzotriazole;

(v) 5-trifluoromethyl-2-[2-hydroxy-3-tert-butyl-5-(2-hydroxyethyl)phenyl]-2H-benzotriazole;

(w) 5-trifluoromethyl-2-[2-hydroxy-5-(2-hydroxyethyl)phenyl]-2H-benzotriazole;

(x) 5-trifluoromethyl-2-(2-hydroxy-3,5-di-α-cumylphenyl)-2H-benzotriazole;

(y) 5-fluoro-2-(2-hydroxy-3,5-di-α-cumylphenyl)-2H-benzotriazole;

(z) 5-butylsulfonyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole;

(bb) 5-butylsulfonyl-2-(2-hydroxy-3,5-di-tert-octylphenyl)-2H-benzotriazole;

(cc) 5-trifluoromethyl-2-{2-hydroxy-3-tert-butyl-5-[2-(omega-hydroxyocta(ethyleneoxy)carbonyl)ethyl]phenyl}-2H-benzotriazole;

(dd) 5-chloro-2-(2-hydroxy-3,5-ditert-butylphenyl)-2H-benzotriazole;

(ee) 5-chloro-2-(2-hydroxy-3-tert-butyl-5-methylphenyl)-2H-benzotriazole;

(ff) octyl 3-(5-chloro-2H-benzotriazol-2-yl)-5-tert-butyl4-hydroxyhydrocinnamate; or (gg) 5-chloro-2-(2-hydroxy-3-α-cumyl-5-tert-octylphenyl)-2H-benzotriazole.

It is contemplated that mixtures of such benzotriazoles could also be used effectively in this invention.

Additionally, the instant red-shifted benzotriazoles can be used in combination with other UV absorbers including conventional benzotriazoles, s-triazines, benzoates, α-cyanoacrylates, benzophenones, malonates, oxanilides and salicylates, and/or with antioxidants such as the phenolic antioxidants, phosphites or hydroxylamines would provide candle wax with superior stabilization properties.

The effective amount of red-shifted benzotriazole alone or in combination with other UV absorbers and/or with an antioxidant in the candle wax is 0.01 to 10 by weight based on the wax; preferably is 0.1 to 2% by weight based on the wax; or most preferably is 0.1 to 0.5% by weight based on the wax.

Examples of such phenolic antioxidants and hydroxylamines include the following:

n-octadecyl 3,5-di-tert-butyl-4-hydroxyhydrocinnamate, neopentanetetrayl tetrakis(3,5-di-tert-butyl-4-hydroxyhydrocinammate), di-n-octadecyl 3,5-di-tert-butyl-4-hydroxybenzylphosphonate, 1,3,5-tris(3,5-di-tert-butyl-4-hydroxybenzyl)isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl)isocynurate, 1,1,3,-tris(2-methyl-4-hydroxy-5-tert-butylphenyl)butane, 1,3,5-tris[2-(3,5-di-tert-butyl-4-hydroxyhydrocinnamoyloxy)ethyl]isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5 -di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl)butyrate], octyl 3,5-di-tert-butyl-4-hydroxybenzylmercaptoacetate, bis(3,5-di-tert-butyl-4-hydroxyhydrocinnamoyl)hydrazide, N,N'-bis[2-(3,5-di-tert-butyl-4-hydroxyhydrocinnamoyloxy)-ethyl]oxamide, and N,N-dialkylhydroxylamine prepared from di(hydrogenated tallow)amine by direct oxidation.

A most preferred phenolic antioxidant is neopentanetetrayl tetrakis(3,5-di-tert-butyl-4-hydroxyhydrocinnamate), n-octadecyl 3,5-di-tert-butyl-4-hydroxyhydrocinnamate, 1,3,5-trimethyl-2,4,6-tris(3,5-di-tert-butyl-4-hydroxybenzyl)benzene, 1,3,5-tris(3,5-di-tert-butyl-4-hydroxybenzyl)isocyanurate, 2,6-di-tert-butyl-p-cresol, or 2,2'-ethylidene-bis(4,6-di-tert-butylphenol).

The instant invention also pertains to a composition which comprises (a) white, dyed, dipped, unscented and/or scented candle wax, and (b) an effective stabilizing amount of a combination of (i) a benzotriazole of formula I, II, III or IV as described above, and (ii) a hindered amine;

wherein the ratio by weight of (i) to (ii) is from 10:1 to 1:10; preferably 4:1 to 1:4; most preferably 2:1 to 1:2.

An effective amount of red-shifted benzotriazole plus the hindered amine in the candle wax is 0.01 to 10% by weight, preferably 0.1 to 2% by weight; and most preferably 0.1 to 0.5% by weight based on the wax.

It is contemplated that mixtures of various hindered amines described below could also be used effectively in this invention.

The hindered amine may be conventional hindered amines based on substituted 2,2,6,6-tetrapiperidine structures where the N-atom is substituted with hydrogen or alkyl, such as (a) bis(2,2,6,6-tetramethylpiperidin-4-yl) sebacate, (b) bis(1,2,2,6,6-pentamethylpiperidin-4-yl) sebacate, (c) di(1,2,2,6,6-pentamethylpiperidin-4-yl) (3,5-di-tert-butyl-4-hydroxybenzyl)-butylmalonate, (d) 4-benzoyl-2,2,6,6-tetramethylpiperidine, (e) 4-stearyloxy-2,2,6,6-tetramethylpiperidine, (f) 3-n-octyl-7,7,9,9-tetramethyl-1,3,8-triaza-spiro[4.5]decane-2,4-dione, (g) tris(2,2,6,6-tetramethylpiperidin-4-yl) nitrilotriacetate, (h) 1,2-bis(2,2,6,6-tetramethyl-3-oxopiperazin-4-yl)ethane, (i) 2,2,4,4-tetramethyl-7-oxa-3,20-diaza-21-oxodispiro[5.1.11.2]heneicosane, (j) polycondensation product of 2,4-dichloro-6-tert-octylamino-s-triazine and 4,4'-hexamethylenebis(amino-2,2,6,6-tetramethylpiperidine), (k) polycondensation product of 1-(2-hydroxyethyl)-2,2,6,6-tetramethyl-4-hydroxypiperidine and succinic acid, (l) polycondensation product of 4,4'-hexamethylenebis-(amino-2,2,6,6-tetramethylpiperidine) and 1,2-dibromoethane, (m) tetrakis(2,2,6,6-tetramethylpiperidin-4-yl) 1,2,3,4-butanetetracarboxylate, (n) tetrakis(1,2,2,6,6-pentamethylpiperidin-4-yl) 1,2,3,4-butanetetracarboxylate, (o) polycondensation product of 2,4-dichloro-6-morpholino-s-triazine and 4,4'-hexamethylenebis(amino-2,2,6,6-tetramethylpiperidine), (p) N,N',N",N'''-tetrakis[(4,6-bis(butyl-1,2,2,6,6-pentamethylpiperidin-4-yl)-amino-s-triazin-2-yl]-1,10-diamino-4,7-diazadecane, (q) mixed [2,2,6,6-tetramethylpiperidin-4-yl/β,β,β',β'-tetramethyl-3,9-(2,4,8,10-tetraoxa-spiro[5.5]-undecane) diethyl]1,2,3,4-butane tetracarboxylate, (r) mixed [1,2,2,6,6-pentamethylpiperidin-4-yl/β,β,β',β'-tetramethyl-3,9-(2,4,8,10-tetraoxaspiro[5.5]undecane) diethyl]1,2,3,4-butanetetracarboxylate, (s) octamethylene bis(2,2,6,6-tetramethylpiperidin-4-carboxylate), (t) 4,4'-ethylenebis(2,2,6,6-tetramethylpiperazin-3-one), (u) N-2,2,6,6-tetramethylpiperidin-4-yl-n-dodecylsuccinimide, (v) N-1,2,2,6,6-pentamethylpiperidin-4-yl-n-dodecylsuccinimide, (w) N-1-acetyl-2,2,6,6-tetramethylpiperidin-4-yl-n-dodecylsuccinimide, (x) 1-acetyl-3-dodecyl-7,7,9,9-tetramethyl-1,3,8-triazaspiro[4.5]decane-2,4-dione, (y) bis(1-acetyl-2,2,6,6-tetramethylpiperidin-4-yl) sebacate, (z) 1,3,5-tris {N-cyclohexyl-N-[2-(3,3,5,5-tetramethylpiperazin-2-on-1-yl)ethyl]amino}-s-triazine, (aa) 1,3,5-tris{N-cyclohexyl-N-[2-(3,3,4,5,5-pentamethylpiperazin-2-on-1-yl)ethyl]-amino}-s-triazine, (bb) bis(2,2,6,6-tetramethylpiperidin-4-yl) glutarate, (cc) bis(1,2,2,6,6-pentamethylpiperidin-4-yl) glutarate, (dd) bis(2,2,6,6-tetramethylpiperidin-4-yl) adipate, (ee) bis(1,2,2,6,6-pentamethylpiperidin-4-yl) adipate, (ff) bis(2,2,6,6-tetramethylpiperidin-4-yl) succinate, or (gg) bis(1,2,2,6,6-pentamethylpiperidin-4-yl) succinate.

The hindered amines substituted on the N-atom by an alkoxy, cycloalkoxy or benzyloxy moiety which are useful in the instant invention are described in detail in U.S. Pat. No. 5,204,473. Some preferred hindered amines include the following:

(a) bis(1-octyloxy-2,2,6,6-tetramethylpiperidin-4-yl) sebacate;

(b) bis(1-cyclohexyloxy-2,2,6,6-tetramethylpiperidin-4-yl) sebacate;

(c) 1-cyclohexyloxy-2,2,6,6-tetramethyl-4-octadecylaminopiperidine;

(d) 2,4-bis[N-(1-cyclohexyloxy-2,2,6,6-tetramethylpiperidin-4-yl)-N-butylamino]-6-(2-hydroxyethylamino)-s-triazine;

(e) bis(1-cyclohexyloxy-2,2,6,6-tetramethylpiperidin-4-yl) adipate;

(f) the oligomeric compound which is the condensation product of 4,4'-hexa-methylenebis(amino-2,2,6,6-tetramethylpiperidine) and 2,4-dichloro-6-[(1-octyl-oxy-2,2,6,6-tetramethylpiperidin-4-yl)butylamino]-s-triazine end-capped with 2-chloro-4,6-bis(dibutylamino)-s-triazine;

(g) the oligomeric compound which is the condensation product of 4,4'-hexa-methylenebis(amino-2,2,6,6-tetramethylpiperidine) and 2,4-dichloro-6-[(1-cyclohexyl-oxy-2,2,6,6-tetramethylpiperidin-4-yl)butylamino]-s-triazine end-capped with 2-chloro-4,6-bis(dibutylamino)-s-triazine;

(h) 1-methoxy-4-hydroxy-2,2,6,6-tetramethylpiperidine;

(i) 1-octyloxy-4-hydroxy-2,2,6,6-tetramethylpiperidine;

(j) 1-cyclohexyloxy-4-hydroxy-2,2,6,6-tetramethylpiperidine;

(k) 1-methoxy-4-oxo-2,2,6,6-tetramethylpiperidine;

(l) 1-octyloxy-4-oxo-2,2,6,6-tetramethylpiperidine;

(m) 1-cyclohexyloxy-4-oxo-2,2,6,6-tetramethylpiperidine, (n) bis(1-heptyloxy-2,2,6,6-tetramethylpiperidin-4-yl) sebacate, (o) bis(1-nonyloxy-2,2,6,6-tetramethylpiperidin-4-yl) sebacate, (p) bis(1-dodecyloxy-2,2,6,6-tetramethylpiperidin-4-yl) sebacate, or (q) N,N',N",N'''-tetrakis[(4,6-bis(butyl-1-octyloxy-2,2,6,6-pentamethylpiperidin-4-yl)-amino-s-triazin-2-yl]-1,10-diamino-4,7-diazadecane.

The hindered amines substituted on the N-atom by a hydroxy-substituted alkoxy group are disclosed in copending application Ser. No. 09/257,711 whose relevant parts are also incorporated herein by reference.

The hindered amines substituted on the N-atom by a hydroxy-substituted alkoxy moiety which are useful in the instant invention include the following:

(a) 1-(2-hydroxy-2-methylpropoxy)-4-octadecanoyloxy-2,2,6,6-tetramethylpiperidine;

(b) 1-(2-hydroxy-2-methylpropoxy)-4-hydroxy-2,2,6,6-tetramethylpiperidine;

(c) 1-(2-hydroxy-2-methylpropoxy)-4-oxo-2,2,6,6-tetramethylpiperidine;

(d) bis(1-(2-hydroxy-2-methylpropoxy)-2,2,6,6-tetramethylpiperidin-4-yl) sebacate;

(e) bis(1-(2-hydroxy-2-methylpropoxy)-2,2,6,6-tetramethylpiperidin-4-yl) adipate;

(f) bis(1-(2-hydroxy-2-methylpropoxy)-2,2,6,6-tetramethylpiperidin-4-yl) succinate;

(g) bis(1-(2-hydroxy-2-methylpropoxy)-2,2,6,6-tetramethylpiperidin-4-yl) glutarate; and (h) 2,4-bis{N-[1-(2-hydroxy-2-methylpropoxy)-2,2,6,6-tetramethylpiperidin-4-yl]-N-butylamino}-6-(2-hydroxyethylamino)-s-triazine.

It is also contemplated that mixtures of the N-alkoxy or N-cyclohexyloxy substituted hindered amines; mixtures of the N-hydroxy-alkoxy substituted hindered amines; and mixtures of these two types of hindered amines can be used in the instant invention.

Additionally, it is clear that mixtures of the N-alkoxy or N-cyclohexyloxy substituted hindered amines or mixtures of the N-hydroxy-alkoxy substituted hindered amines with conventional hindered amines where the N-atom is substituted by hydrogen, alkyl, aryl or acyl may also be useful.

It should be noted that candles contain a host of various components. The base materials may be made up of the following:
paraffin wax,
natural oils,
polyamide plus fatty acid/ester,
fatty acids such as stearin,
opacifiers,
beeswax,
glycerides plus oxidized wax,
alcohols, and
ethylene oligomers.

Candles also contain a number of additives such as the following:
mold release agents,
fragrances,
insect repellants or insecticides,
hardeners,
crystal modifiers,
clarifiers,
guttering reducers,
colorants,
f.p. control agents,
stretchability improvers,
gelling agents,
extrusion aids, and
vortex reducers.

Each of the various components are meant to control or modify the properties of the candle to insure proper burning, reduce channelling, aid in uniform melting, and the like. The colorants and fragrances obviously are there to provide the proper color, scent or other aesthetic appeal.

Of increasing importance are the transparent gel candles which look like clear glass, but which burn like a classical candle. As is discussed in detail in U.S. Pat. No. 5,879,694, the relevant parts of which are incorporated herein by reference, these gel candles usually contain a copolymer selected from the group consisting of a triblock, radial block, diblock or multiblock copolymer classically made up of at least two thermodynamically incompatible segments containing both hard and soft segments. Typical of such block copolymers is KRATON® (Shell Chemical Co.) which consists of block segments of styrene monomer units and rubber monomer or comonomer units. The most common structure found in KRATON® D series is a linear ABA block with styrene-butadiene-styrene (SBS) or styrene-isoprene-styrene (SIS).

The following examples are meant for illustrative purposes only and are not to be construed to limit the instant invention in any manner whatsoever.

Raw Materials

Fully refined wax with a melting point of 137–141° C. and <0.5% oil content is obtained from the Astor Wax Company.

Dyes are supplied by French Color and Chemical Corporation.

Additional wax samples are supplied by the Candle Corporation of America. These samples contained red, green or yellow dyes and fragrances.

The UV absorbers and hindered amine stabilizers are obtained from the Ciba Speciality Chemicals Corporation.

Sample Preparation

The wax samples obtained from the Candle Corporation of America already contain a dye and a fragrance (scent). In these cases, the wax is melted and the appropriate stabilizer (s) is (are) added and dissolved in the molten wax. The stabilized wax is then poured into a mold (7"×8.5"×0.25"; 17.78 cm×21.59 cm×0.635 cm) giving a wax plaque.

To the wax samples obtained from the Astor Wax Company after melting are added 0.001% by weight of the test dyes to give a dyed candle wax base. To the dyed wax base after melting is (are) added the appropriate stabilizer(s). The melted stabilized and dyed wax is then poured into the mold described above to give a wax plaque.

Sample Exposure

The wax plaques described above are cut into eight equal pieces (3.5"×2.125"; 8.89 cm×5.40 cm). Triplicate samples of each are exposed under a bank of six (6) cool-white fluorescent lamps (40 watts) or under a bank of six (6) UV lamps having a wavelength of 368 nm with the test samples being twelve (12) inches (30.48 cm) below the lamps.

Dye color fade (or color change) is measured by a Macbeth ColorEye Spectrophotometer with a 6 inch integrating sphere. The conditions are: 10 degree observer, D65 illuminant and 8 degree viewing angle.

Initial color measurements are taken using the above parameters. The L, a and b values are calculated using the CIE system from the reflectance values. YI is calculated from the L, a and b values. Subsequent measurements are taken at specified intervals. Delta L, a, b and YI values are simply the difference between the initial values and the values at each interval. Delta($\Delta$) E is calculated as follows:

$$[(\text{Delta } L)^2 + (\text{Delta } a)^2 + (\text{Delta } b)^2]^{1/2} = \text{Delta } E.$$

EXAMPLE 1

Color Fade of Blue #C-19 in Unscented Candle Wax under Fluorescent Lamp Exposure A variety of different UV absorbers are evaluated in unscented candle wax which contains Blue #C-19 under fluorescent lamp exposure. The $\Delta E$ values represent the change in color after the indicated days of exposure. A low $\Delta E$ value indicates less change in color and is highly desired.

| | $\Delta E$ after | | |
|---|---|---|---|
| Sample* (wt % UVA) | 9 days | 33 days | 58 days |
| Blank (no UVA) | 12.9 | 42.9 | 44.1 |
| A (0.2%) | 0.60 | 3.66 | 8.96 |
| B (0.2%) | 0.60 | 4.99 | 11.01 |
| C (0.2%) | 0.55 | 2.55 | 6.39 |
| C (0.4%) | 0.68 | 0.73 | 2.19 |

*A is 2-(2-hydroxy-5-tert-octylphenyl)-2H-benzotriazole, TINUVIN ® 329, CIBA.
B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.

These data show that Compound C, a red-shifted benzotriazole UV absorber, clearly protect the blue dye in the unscented candle wax far better than conventional UV absorbers.

EXAMPLE 2

Color Fade of Blue #C-19 in Unscented Candle Wax under UV Lamp Exposure

A variety of different UV absorbers are evaluated in unscented candle wax which contains Blue #C-19 under UV lamp exposure at 368 nm wavelength. The ΔE values represent the change in color after the indicated days of exposure. A low ΔE value indicates less change in color and is highly desired.

|  | ΔE after | | |
|---|---|---|---|
| Sample* (wt % UVA) | 3 days | 20 days | 46 days |
| Blank (no UVA) | 15.26 | 26.84 | 26.83 |
| A (0.2%) | 0.72 | 2.49 | 7.41 |
| B (0.2%) | 0.62 | 3.33 | 10.15 |
| C (0.2%) | 0.47 | 1.90 | 4.77 |
| B (0.4%) | 0.52 | 3.28 | 10.19 |
| C (0.4%) | 0.32 | 0.54 | 1.61 |

*A is 2-(2-hydroxy-5-tert-octylphenyl)-2H-benzotriazole, TINUVIN ® 329, CIBA.
B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.

These data show that Compound C, a red-shifted benzotriazole UV absorber, clearly protect the blue dye in the unscented candle wax far better than conventional UV absorbers.

EXAMPLE 3

Color Fade of Red #C-15 in Unscented Candle Wax under Fluorescent Lamp Exposure A variety of different UV absorbers are evaluated in unscented candle wax which contains Red #C-15 under fluorescent lamp exposure. The ΔE values represent the change in color after the indicated days of exposure. A low ΔE value indicates less change in color and is highly desired.

|  | ΔE after | | |
|---|---|---|---|
| Sample* (wt % UVA) | 3 days | 33 days | 58 days |
| Blank (no UVA) | 2.35 | 30.70 | 33.79 |
| B (0.2%) | 2.32 | 8.37 | 15.86 |
| C (0.2%) | 0.27 | 2.20 | 5.05 |

*B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.

These data show that Compound C, a red-shifted benzotriazole UV absorber, clearly protect the red dye in the unscented candle wax far better than conventional UV absorbers.

EXAMPLE 4

Color Fade of Red #C-15 in Unscented Candle Wax under UV Lamp Exposure

A variety of different UV absorbers are evaluated in unscented candle wax which contains Red #C-15 under UV lamp exposure at 368 nm wavelength. The ΔE values represent the change in color after the indicated days of exposure. A low ΔE value indicates less change in color and is highly desired.

|  | ΔE after | | |
|---|---|---|---|
| Sample* (wt % UVA) | 1 day | 33 days | 46 days |
| Blank (no UVA) | 4.21 | 33.13 | 33.37 |
| B (0.2%) | 0.52 | 10.93 | 15.86 |
| A (0.1%) + D (0.1%) | 0.49 | 7.47 | 11.69 |
| A (0.2%) | 0.40 | 5.08 | 8.17 |
| C (0.2%) | 0.35 | 3.93 | 6.51 |

*A is 2-(2-hydroxy-5-tert-octylphenyl)-2H-benzotriazole, TINUVIN ® 329, CIBA.
B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.
D is 4-octyloxy-2-hydroxybenzophenone, CHIMMASORB ® 81, CIBA.

These data show that Compound C, a red-shifted benzotriazole UV absorber, clearly protect the red dye in the unscented candle wax far better than conventional UV absorbers.

EXAMPLE 5

Color Fade of Yellow #C-47 in Unscented Candle Wax under Fluorescent Lamp Exposure A variety of different UV absorbers are evaluated in unscented candle wax which contains Yellow #C-47 under fluorescent lamp exposure. The ΔE values represent the change in color after the indicated days of exposure. A low ΔE value indicates less change in color and is highly desired.

|  | ΔE after | | |
|---|---|---|---|
| Sample* (wt % UVA) | 9 days | 28 days | 40 days |
| A (0.2%) | 0.46 | 1.31 | 1.41 |
| B (0.2%) | 0.60 | 1.73 | 3.32 |
| A (0.1%) + D (0.1%) | 0.40 | 1.35 | 1.85 |
| C (0.2%) | 0.52 | 0.84 | 1.21 |
| C (0.4%) | 0.27 | 0.53 | 0.83 |

*A is 2-(2-hydroxy-5-tert-octylphenyl)-2H-benzotriazole, TINUVIN ® 329, CIBA.
B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.
D is 4-octyloxy-2-hydroxybenzophenone, CHIMMASORB ® 81, CIBA.

These data show that Compound C, a red-shifted benzotriazole UV absorber, clearly protect the yellow dye in the unscented candle wax far better than conventional UV absorbers.

EXAMPLE 6

Color Fade of Yellow #C-47 in Unscented Candle Wax under UV Lamp Exposure

A variety of different UV absorbers are evaluated in unscented candle wax which contains Yellow #C-47 under UV lamp exposure at 368 nm wavelength. The ΔE values represent the change in color after the indicated days of exposure. A low ΔE value indicates less change in color and is highly desired.

| Sample* (wt % UVA) | ΔE after | | |
|---|---|---|---|
| | 41 days | 80 days | 121 days |
| Blank (no UVA) | 7.25 | 12.85 | 15.16 |
| B (0.2%) | 5.25 | 9.35 | 11.06 |
| C (0.2%) | 0.99 | 1.94 | 2.34 |

*B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.

These data show that Compound C, a red-shifted benzotriazole UV absorber, clearly protect the yellow dye in the unscented candle wax far better than conventional UV absorbers.

EXAMPLE 7

Color Change of a White Unscented Candle Wax under UV Lamp Exposure

A variety of different UV absorbers are evaluated in a white unscented candle wax under UV lamp exposure at 368 nm wavelength. The ΔE values represent the change in color after the indicated days of exposure. A low ΔE value indicates less change in color and is highly desired.

| Sample* (wt % UVA) | ΔE after | | |
|---|---|---|---|
| | 1 day | 62 days | 121 days |
| Blank (no UVA) | 3.40 | 1.82 | 1.66 |
| A (0.2%) | 0.14 | 0.63 | 0.83 |
| B (0.2%) | 0.16 | 0.79 | 1.18 |
| A (0.1%) + D (0.1%) | 0.09 | 0.98 | 1.14 |
| C (0.2%) | 0.16 | 0.31 | 0.38 |

*A is 2-(2-hydroxy-5-tert-octylphenyl)-2H-benzotriazole, TINUVIN ® 329, CIBA.
B is octyl 3-(benzotriazol-2-yl)-5-tert-butyl-4-hydroxyhydrocinnamate, TINUVIN ® 384, CIBA.
C is 5-trifluoromethyl-2-(2-hydroxy-3-α-cumyl-5-tert-octylphenyl)-2H-benzotriazole.
D is 4-octyloxy-2-hydroxybenzophenone, CHIMMASORB ® 81, CIBA.

These data show that Compound C, a red-shifted benzotriazole UV absorber, clearly protects the white unscented candle wax from color change far better than conventional UV absorbers.

EXAMPLE 8

Color Change of Yellow Scented Candle Wax under Fluorescent Lamp Exposure

A variety of different UV absorbers are evaluated in yellow scented candle wax obtained from the Candle Corporation of America under fluorescent lamp exposure. The ΔE values represent the change in color after the indicated days of exposure. A low ΔE value indicates less change in color and is highly desired.

| Sample* (wt % add) | ΔE after | | |
|---|---|---|---|
| | 9 days | 14 days | 26 days |
| Blank (no add) | 6.15 | 8.36 | 9.41 |
| A (0.1%) + D (0.1%) | 4.00 | 5.71 | 8.86 |
| D (0.2%) | 4.62 | 6.22 | 8.83 |
| E (0.1%) + F (0.1%) | 4.91 | 6.43 | 8.37 |

*A is 2-(2-hydroxy-5-tert-octylphenyl)-2H-benzotriazole, TINUVIN ® 329, CIBA.
D is 4-octyloxy-2-hydroxybenzophenone, CHIMMASORB ® 81, CIBA.
E is 5-trifluoromethyl-2-(2-hydroxy-5-tert-octylphenyl)-2H-benzotriazole.
F is bis(1,2,2,6,6-pentamethylpiperidin-4-yl) sebacate, TINUVIN ® 292, CIBA.

These data show that a combination of Compound E, a red-shifted benzotriazole UV absorber, and a hindered amine Compound F clearly protects the yellow dye in the scented candle wax better than conventional UV absorbers.

EXAMPLE 9

Color Change of Yellow Scented Candle Wax under UV Lamp Exposure

A variety of different UV absorbers are evaluated in yellow scented candle wax obtained from the Candle Corporation of America under UV lamp exposure at 368 nm wavelength. The ΔE values represent the change in color after the indicated days of exposure. A low ΔE value indicates less change in color and is highly desired.

| Sample* (wt % add) | ΔE after | | |
|---|---|---|---|
| | 7 days | 11 days | 15 days |
| Blank (no add) | 4.88 | 4.97 | 5.06 |
| A (0.2%) | 3.56 | 4.06 | 5.05 |
| D (0.2%) | 4.57 | 5.41 | 5.92 |
| A (0.1%) + D (0.1%) | 3.96 | 4.50 | 5.35 |
| E (0.2%) | 3.75 | 4.27 | 4.97 |
| E (0.1%) + F (0.1%) | 1.95 | 2.27 | 2.74 |

*A is 2-(2-hydroxy-5-tert-octylphenyl)-2H-benzotriazole, TINUVIN ® 329, CIBA.
D is 4-octyloxy-2-hydroxybenzophenone, CHIMMASORB ® 81, CIBA.
E is 5-trifluoromethyl-2-(2-hydroxy-5-tert-octylphenyl)-2H-benzotriazole.
F is bis(1,2,2,6,6-pentamethylpiperidin-4-yl) sebacate, TINUVIN ® 292, CIBA.

These data show that a combination of Compound E, a red-shifted benzotriazole UV absorber, and a hindered amine Compound F clearly protects the yellow dye in the scented candle wax far better than conventional UV absorbers.

EXAMPLE 10

Color Fade of Red Scented Candle Wax under UV Lamp Exposure

A variety of different UV absorbers are evaluated in red scented candle wax obtained from the Candle Corporation of America under UV lamp exposure at 368 nm wavelength. The ΔE values represent the change in color after the indicated days of exposure. A low ΔE value indicates less change in color and is highly desired.

|  | ΔE after | | |
|---|---|---|---|
| Sample* (wt % add) | 8 days | 40 days | 60 days |
| Blank (no add) | 5.20 | 51.99 | 52.98 |
| A (0.2%) | 3.62 | 7.45 | 9.93 |
| D (0.2%) | 3.90 | 11.86 | 14.48 |
| A (0.1%) + D (0.1%) | 2.48 | 6.93 | 9.03 |
| E (0.2%) | 2.99 | 5.86 | 8.52 |
| E (0.1%) + F (0.1%) | 3.66 | 5.82 | 7.00 |

*A is 2-(2-hydroxy-5-tert-octylphenyl)-2H-benzotriazole, TINUVIN ® 329, CIBA.
D is 4-octyloxy-2-hydroxybenzophenone, CHIMMASORB ® 81, CIBA.
E is 5-trifluoromethyl-2-(2-hydroxy-5-tert-octylphenyl)-2H-benzotriazole.
F is bis(1,2,2,6,6-pentamethylpiperidin-4-yl) sebacate, TINUVIN ® 292, CIBA.

These data show that Compound E, a red-shifted benzotriazole UV absorber, particularly in combination with a hindered amine Compound F, protects the red scented candle wax far better than conventional UV absorbers.

EXAMPLE 11

Color Fade of Green Scented Candle Wax under Fluorescent Lamp Exposure

A variety of different UV absorbers are evaluated in green scented candle wax obtained from the Candle Corporation of America under fluorescent lamp exposure. The ΔE values represent the change in color after the indicated days of exposure. A low ΔE value indicates less change in color and is highly desired.

|  | ΔE after | | |
|---|---|---|---|
| Sample* (wt % add) | 9 days | 20 days | 26 days |
| Blank (no add) | 5.05 | 8.06 | 10.94 |
| A (0.2%) | 3.23 | 4.83 | 7.42 |
| D (0.2%) | 2.82 | 5.04 | 7.76 |
| E (0.2%) | 3.29 | 4.53 | 7.01 |
| E (0.1%) + F (0.1%) | 2.49 | 1.82 | 2.37 |

*A is 2-(2-hydroxy-5-tert-octylphenyl)-2H-benzotriazole, TINUVIN ® 329, CIBA.
D is 4-octyloxy-2-hydroxybenzophenone, CHIMMASORB ® 81, CIBA.
E is 5-trifluoromethyl-2-(2-hydroxy-5-tert-octylphenyl)-2H-benzotriazole.
F is bis(1,2,2,6,6-pentamethylpiperidin-4-yl) sebacate, TINUVIN ® 292, CIBA.

These data show that Compound E, a red-shifted benzotriazole UV absorber, particularly in combination with a hindered amine Compound F, protects the green scented candle wax far better than conventional UV absorbers.

EXAMPLE 12

Color Fade of Green Scented Candle Wax under UV Lamp Exposure

A variety of different UV absorbers are evaluated in green scented candle wax obtained from the Candle Corporation of America under UV lamp exposure at 368 nm wavelength. The ΔE values represent the change in color after the indicated days of exposure. A low ΔE value indicates less change in color and is highly desired.

|  | ΔE after | | |
|---|---|---|---|
| Sample* (wt % add) | 7 days | 11 days | 25 days |
| Blank (no add) | 6.35 | 7.69 | 9.93 |
| A (0.2%) | 0.73 | 1.49 | 2.86 |
| D (0.2%) | 4.17 | 5.89 | 8.73 |
| A (0.1%) + D (0.1%) | 1.64 | 2.71 | 4.48 |
| E (0.2%) | 0.43 | 1.09 | 1.94 |
| E (0.1%) + F (0.1%) | 0.24 | 0.64 | 0.79 |

*A is 2-(2-hydroxy-5-tert-octylphenyl)-2H-benzotriazole, TINUVIN ® 329, CIBA.
D is 4-octyloxy-2-hydroxybenzophenone, CHIMMASORB ® 81, CIBA.
E is 5-trifluoromethyl-2-(2-hydroxy-5-tert-octylphenyl)-2H-benzotriazole.
F is bis(1,2,2,6,6-pentamethylpiperidin-4-yl) sebacate, TINUVIN ® 292, CIBA.

These data show that Compound E, a red-shifted benzotriazole UV absorber, particularly in combination with a hindered amine Compound F, protects the green scented candle wax far better than conventional UV absorbers.

EXAMPLE 13

Color Fade of Blue Scented Candle Wax under UV Lamp Exposure

A variety of different UV absorbers are evaluated in blue scented candle wax obtained from the Candle Corporation of America under UV lamp exposure at 368 nm wavelength. The ΔE values represent the change in color after the indicated days of exposure. A low ΔE value indicates less change in color and is highly desired.

|  | ΔE after | | |
|---|---|---|---|
| Sample* (wt % add) | 8 days | 29 days | 54 days |
| Blank (no add) | 28.72 | 40.65 | 43.80 |
| A (0.2%) | 4.17 | 12.95 | 18.75 |
| D (0.2%) | 10.44 | 18.80 | 22.94 |
| A (0.1%) + D (0.1%) | 4.54 | 13.94 | 19.53 |
| E (0.2%) | 3.74 | 10.22 | 12.94 |
| E (0.1%) + F (0.1%) | 1.46 | 5.94 | 6.70 |

*A is 2-(2-hydroxy-5-tert-octylphenyl)-2H-benzotriazole, TINUVIN ® 329, CIBA.
D is 4-octyloxy-2-hydroxybenzophenone, CHIMMASORB ® 81, CIBA.
E is 5-trifluoromethyl-2-(2-hydroxy-5-tert-octylphenyl)-2H-benzotriazole.
F is bis(1,2,2,6,6-pentamethylpiperidin-4-yl) sebacate, TINUVIN ® 292, CIBA.

These data show that Compound E, a red-shifted benzotriazole UV absorber, particularly in combination with a hindered amine Compound F, protects the blue scented candle wax far better than conventional UV absorbers.

EXAMPLE 14

Blue unscented candle wax is well stabilized according to the procedure of Example 1 using 0.1% by weight of 5-trifluoromethyl-2-(2-hydroxy-3-α-cumyl-5-tert-octylphenyl)-2H-benzotriazole in combination with 0.1% by weight of 4-octyloxy-2-hydroxybenzophenone, CHIMMASORB® 81, CIBA.

EXAMPLE 15

Blue unscented candle wax is well stabilized according to the procedure of Example 2 using 0.1% by weight of 5-trifluoromethyl-2-(2-hydroxy-5-tert-octyl-phenyl)-2H-benzotriazole in combination with 0.1% by weight of 2,4-bis(2,4-dimethyl-phenyl)-6-[2-hydroxy-4-(3-do-/tri-decyloxy-2-hydroxypropoxy)-5-α-cumylphenyl]-s-triazine.

EXAMPLE 16

Red unscented candle wax is well stabilized according to the procedure of Example 3 using 0.1% by weight of 5-trifluoromethyl-2-(2-hydroxy-3,5-di-tert-octyl-phenyl)-2H-benzotriazole in combination with 0.1% by weight of 2-[2-hydroxy- 3-(α,α-dimethylbenzyl)-5-tert-octylphenyl]-2H-benzotriazole, TINUVIN® 928, CIBA.

EXAMPLE 17

Red unscented candle wax is well stabilized according to the procedure of Example 4 using 0.1% by weight of 2,2'-methylene-bis[6-(5-trifluoromethyl-2H-benzotriazol-2-yl)-4-tert-octylphenol] in combination with 0.2% by weight of octyl 3-(benzotriazol-2-yl)-5-tert-butyl-4-hydroxyhydrocinnamate, TINUVIN® 384, CIBA.

EXAMPLE 18

Yellow unscented candle wax is well stabilized according to the procedure of Example 5 using 0.1% by weight of isooctyl 3-(5-trifluoromethyl-2H-benzotriazol-2-yl)-5-tert-butyl-4-hydroxyhydrocinnamate in combination with 0.1% by weight of N-(2-ethoxy-5-tert-butylphenyl)-N'-(2-ethyl-4-tert-butylphenyl)oxalamide (an oxanilide).

EXAMPLE 19

Yellow unscented candle wax is well stabilized according to the procedure of Example 6 using 0.1% by weight of 5-trifluoromethyl-2-{2-hydroxy-3-tert-butyl-5-[2-(omega-hydroxy-octa(ethyleneoxy)carbonyl)ethyl]phenyl}-2H-benzotriazole in combination with 0.2% by weight of 4-tert-octylphenyl 2-hydroxybenzoate.

EXAMPLE 20

White unscented candle wax is well stabilized according to the procedure of Example 7 using 0.1% by weight of 5-trifluoromethyl-2-(2-hydroxy-3-α-cumyl-5-tert-octylphenyl)-2H-benzotriazole in combination with 0.2% by weight of 3-hydroxyphenyl benzoate.

EXAMPLE 21

Yellow scented candle wax is well stabilized according to the procedure of Example 8 using 0.1% by weight of 5-trifluoromethyl-2-(2-hydroxy-5-tert-octyl-phenyl)-2H-benzotriazole in combination with 0.1% by weight of dodecyl 2-cyano-3,3,-diphenylacrylate.

EXAMPLE 22

Yellow scented candle wax is well stabilized according to the procedure of Example 9 using 0.1% by weight of 5-butylsulfonyl-2-(2-hydroxy-3,5-di-tert-octyl-phenyl)-2H-benzotriazole in combination with 0.1% by weight of poly-condensation product of 2,4-dichloro-6-tert-octylamino-s-triazine and 4,4'-hexamethylenebis(amino-2,2,6,6-tetramethylpiperidine), CHIMASSORB® 944, CIBA.

EXAMPLE 23

Red scented candle wax is well stabilized according to the procedure of Example 10 using 0.1% by weight of 5-trifluoromethyl-2-(2-hydroxy-5-tert-octylphenyl)-2H-benzotriazole in combination with 0.1% by weight of bis(2,2,6,6-tetramethylpiperidin-4-yl) sebacate, TINUVIN® 770, CIBA.

EXAMPLE 24

Green scented candle wax is well stabilized according to the procedure of Example 11 using 0.1% by weight of 5-trifluoromethyl-2-(2-hydroxy-3-α-cumyl-5-tert-octyl-phenyl)-2H-benzotriazole in combination with 0.1% by weight of bis(1-octyloxy-2,2,6,6-tetramethylpiperidin-4-yl) sebacate, TINUVIN® 123, CIBA.

EXAMPLE 25

Green scented candle wax is well stabilized according to the procedure of Example 12 using 0.1% by weight of 5-trifluoromethyl-2-(2-hydroxy-5-tert-octylphenyl)-2H-benzotriazole in combination with 0.1% by weight of 2,4-bis[N-(1-cyclohexyloxy-2,2,6,6-tetramethylpiperidin-4-yl)-N-butylamino]-6-(2-hydroxyethylamino)-s-triazine.

EXAMPLE 26

Blue scented candle wax is well stabilized according to the procedure of Example 13 using 0.2% by weight of 5-trifluoromethyl-2-(2-hydroxy-5-tert-octylphenyl)-2H-benzotriazole in combination with 0.1% by weight of 1-cyclohexyloxy-4-hydroxy-2,2,6,6-tetramethylpiperidine.

EXAMPLE 27

Blue unscented candle wax is well stabilized according to the procedure of Example 1 using 0.1% by weight of methylene-2-[4-tert-octyl-6-(2H-benzotriazol-2-yl)-phenol] 2'-[4-tert-octyl-6-(5-trifluoromethyl-2H-benzotriazol-2-yl) phenol] in combination with 0.1% by weight of 1-(2-hydroxy-2-methylpropoxy)-4-octadecanoyloxy-2,2,6,6-tetramethylpiperidine.

EXAMPLE 28

Blue unscented candle wax is well stabilized according to the procedure of Example 2 using 0.1% by weight of methylene-2-[4-tert-octyl-6-(2H-benzotriazol-2-yl)-phenol] 2'-[4-tert-octyl-6-(5-trifluoromethyl-2H-benzotriazol-2-yl) phenol] in combination with 0.1% by weight of 1-(2-hydroxy-2-methylpropoxy)-4-hydroxy-2,2,6,6-tetramethylpiperidine.

EXAMPLE 29

Red unscented candle wax is well stabilized according to the procedure of Example 3 using 0.1% by weight of 5-trifluoromethyl-2-(2-hydroxy-3-dodecyl-5-methylphenyl)-2H-benzotriazole in combination with 0.1% by weight of bis(1-(2-hydroxy- 2-methylpropoxy)-2,2,6,6-tetramethylpiperidin-4-yl) adipate.

EXAMPLE 30

Red unscented candle wax is well stabilized according to the procedure of Example 4 using 0.05% by weight of 5-trifluoromethyl-2-(2-hydroxy-5-tert-octylphenyl)-2H-benzotriazole in combination with 0.05% by weight of octyl 3-(benzotriazol-2-yl)-5-tert-butyl-4-hydroxyhydrocinnamate, TINUVIN® 384, CIBA, and 0.1% by weight of bis(1,2,2,6,6-pentamethylpiperidin-4-yl) sebacate, TINUVIN® 292, CIBA.

EXAMPLE 31

Yellow unscented candle wax is well stabilized according to the procedure of Example 5 using 0.05% by weight of 5-trifluoromethyl-2-(2-hydroxy-3-α-cumyl-5-tert-octylphenyl)-2H-benzotriazole in combination with 0.05% by weight of 2-{2-hydroxy-3-tert-butyl-5-[2-(omega-hydroxy-octa(ethyleneoxy)carbonyl)ethyl]phenyl}-2H-benzotriazole, TINUVIN® 1130, CIBA, and 0.1%) by weight of bis(2,2,6,6-tetramethylpiperidin-4-yl) sebacate, TINUVIN® 770, CIBA.

EXAMPLE 32

Yellow unscented candle wax is well stabilized according to the procedure of Example 6 using 0.1% by weight of 5-trifluoromethyl-2-{2-hydroxy-3-tert-butyl-5-[2-(omega-hydroxy-octa(ethyleneoxy)carbonyl)ethyl]phenyl}-2H-benzotriazole in combination with 0.1% by weight of octyl 3-(benzotriazol-2-yl)-5-tert-butyl-4-hydroxyhydrocinnamate, TINUVIN® 384, CIBA and 0.1% by weight of bis(1-octyloxy-2,2,6,6-tetramethylpiperidin-4-yl) sebacate, TINUVIN® 123, CIBA.

EXAMPLE 33

White unscented candle wax is well stabilized according to the procedure of Example 7 using 0.1% by weight of isooctyl 3-(5-trifluoromethyl-2H-benzotriazol-2-yl)-5-tert-butyl-4-hydroxyhydrocinnamate in combination with 0.1% by weight of 2-{2-hydroxy-3-tert-butyl-5-[2-(omega-hydroxy-octa(ethyleneoxy)carbonyl)ethyl-phenyl}-2H-benzotriazole, TINUVIN® 1130, CIBA, and 0.1% by weight of 2,4-bis[N-(1-cyclohexyloxy-2,2,6,6-tetramethylpiperidin-4-yl)-N-butylamino]-6-(2-hydroxyethyl-amino)-s-triazine.

EXAMPLE 34

Yellow scented candle wax is well stabilized according to the procedure of Example 8 using 0.1% by weight of 5-trifluoromethyl-2-(2-hydroxy-3-α-cumyl-5-tert-octylphenyl)-2H-benzotriazole in combination with 0.1% by weight of octyl 3-(benzotriazol-2-yl)-5-tert-butyl-4-hydroxyhydrocinnamate, TINUVIN® 384, CIBA and 0.1% by weight of 1-(2-hydroxy-2-methylpropoxy)-4-octadecanoyloxy-2,2,6,6-tetramethylpiperidine.

EXAMPLE 35

Yellow scented candle wax is well stabilized according to the procedure of Example 9 using 0.1% by weight of 5-trifluoromethyl-2-(2-hydroxy-5-tert-octylphenyl)-2H-benzotriazole in combination with 0.1% by weight of 2-{2-hydroxy-3-tert-butyl-5-[2-(omega-hydroxy-octa (ethyleneoxy )carbonyl)ethyl]phenyl}-2H-benzotriazole, TINUVIN® 1130, CIBA, and 0.1% by weight of bis(1-(2-hydroxy-2-methylpropoxy)-2,2,6,6-tetramethylpiperidin-4-yl) adipate.

EXAMPLE 36

Red scented candle wax is well stabilized according to the procedure of Example 10 using 0.05% by weight of 5-butylsulfonyl-2-(2-hydroxy-3,5-di-tert-octylphenyl)-2H-benzotriazole in combination with 0.05% by weight of 4-octyloxy-2-hydroxybenzophenone, CHIMMASORB® 81, CIBA and 0.1% by weight of bis(1,2,2,6,6-pentamethylpiperidin-4-yl) sebacate, TINUVIN® 292, CIBA.

EXAMPLE 37

Green scented candle wax is well stabilized according to the procedure of Example 11 using 0.1% by weight of 5-trifluoromethyl-2-(2-hydroxy-3-α-cumyl-5-tert-octylphenyl)-2H-benzotriazole in combination with 0.1% by weight of 2,4-bis(2,4-dimethylphenyl)-6-(2-hydroxy-4-octyloxyphenyl)-s-triazine TINUVIN® 1545, CIBA and 0.1% by weight of bis(1-octyloxy-2,2,6,6-tetramethylpiperidin-4-yl) sebacate, TINUVIN® 123, CIBA.

EXAMPLE 38

Green scented candle wax is well stabilized according to the procedure of Example 12 using 0.1% by weight of 5-trifluoromethyl-2-(2-hydroxy-5-tert-octylphenyl)-2H-benzotriazole in combination with 2,4-bis(2,4-dimethylphenyl)-6-[2-hydroxy-4-(3-do-/tri-decyloxy-2-hydroxypropoxy)-5-α-cumylphenyl]-s-triazine and 0.1% by weight of 1-(2-hydroxy-2-methylpropoxy)-4-octadecanoyloxy-2,2,6,6-tetramethylpiperidine.

EXAMPLE 39

Blue scented candle wax is well stabilized according to the procedure of Example 13 using 0.1% by weight of 5-trifluoromethyl-2-(2-hydroxy-3-α-cumyl-5-tert-octylphenyl)-2H-benzotriazole in combination with 0.1% by weight of N-(2-ethoxyphenyl)-N'-(2-ethylphenyl)oxalamide (an oxanilide) and 0.1% by weight of polycondensation product of 2,4-dichloro-6-morpholino-s-triazine and 4,4'-hexamethylenebis(amino-2,2,6,6-tetramethylpiperidine).

EXAMPLE 40

Blue unscented candle wax is well stabilized according to the procedure of Example 1 using 0.1% by weight of 5-trifluoromethyl-2-(2-hydroxy-5-tert-octyl-phenyl)-2H-benzotriazole in combination with 0.1% by weight of 3-hydroxyphenyl benzoate and 0.1% by weight of 1-cyclohexyloxy-4-hydroxy-2,2,6,6-tetramethylpiperidine.

EXAMPLE 41

Blue unscented candle wax is well stabilized according to the procedure of Example 2 using 0.1% by weight of 5-trifluoromethyl-2-(2-hydroxy-3-α-cumyl-5-tert-octylphenyl)-2H-benzotriazole in combination with 0.1% by weight of pentaerthrityl tetrakis(2-cyano-3,3-diphenylacrylate) and 0.1% by weight of 2,4-bis{N-[1-(2-hydroxy-2-methylpropoxy)-2,2,6,6-tetramethylpiperidin-4-yl]-N-butylamino}-6-(2-hydroxyethylamino)-s-triazine.

EXAMPLE 42

Red unscented candle wax is well stabilized according to the procedure of Example 3 using 0.1% by weight of 5-trifluoromethyl-2-(2-hydroxy-5-tert-octylphenyl)-2H-benzotriazole in combination with 0.1% by weight of 4-tert-butylphenyl 2-hydroxybenzoate and 0.1% by weight of bis(1,2,2,6,6-pentamethylpiperidin-4-yl) sebacate, TINUVIN® 292, CIBA.

EXAMPLE 43

Blue unscented candle wax is well stabilized according to the procedure of Example 1 using 0.1% by weight of 5-trifluoromethyl-2-(2-hydroxy-3-α-cumyl-5-tert-octylphenyl)-2H-benzotriazole in combination with 0.1% by weight of neopentanetetrayl tetrakis(3,5-di-tert-butyl-4-hydroxyhydrocinnammate), IRGANOX® 1010, CIBA.

EXAMPLE 44

Blue unscented candle wax is well stabilized according to the procedure of Example 2 using 0.1% by weight of 5-trifluoromethyl-2-(2-hydroxy-5-tert-octylphenyl)-2H-benzotriazole in combination with 0.1% by weight of 2,6-di-tert-butyl-p-cresol, BHT.

EXAMPLE 45

Red unscented candle wax is well stabilized according to the procedure of Example 3 using 0.1% by weight of octyl 3-(5-chloro-2H-benzotriazol-2-yl)-5-tert-butyl-4-hydroxyhydrocinnamate. TINUVIN® 109, CIBA, in combination with 0.1% by weight of 2-[2-hydroxy-3-(α,α,-dimethylbenzyl)-5-tert-octylphenyl]-2H-benzotriazole, TINUVIN® 928, CIBA.

EXAMPLE 46

Red unscented candle wax is well stabilized according to the procedure of Example 4 using 0.1% by weight of 5-chloro-2-(2-hydroxy-3,5-ditert-butylphenyl)-2H-benzotriazole, TINUVIN® 327, CIBA, in combination with 0.2% by weight of octyl 3-(benzotriazol-2-yl)-5-tert-butyl-4-hydroxyhydrocinnamate, TINUVIN® 384, CIBA.

What is claimed is:
1. A composition which consists essentially of
    (a) candle wax which is white and unscented; white and scented; dyed and unscented; dyed and scented; dipped and unscented; or dipped and scented, and
    (b) an effective stabilizing amount of a red-shifted benzotriazole of formula I, II, III or IV

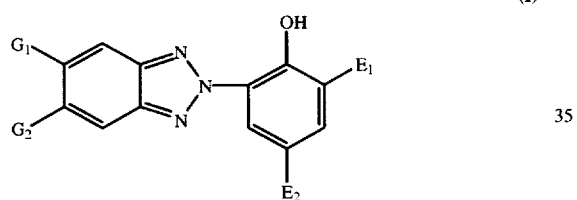

(I)

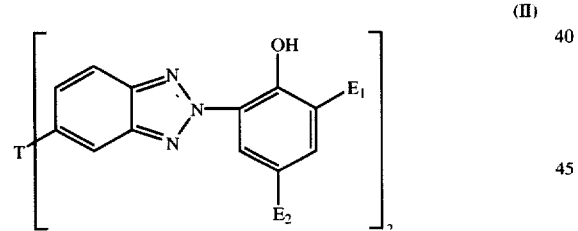

(II)

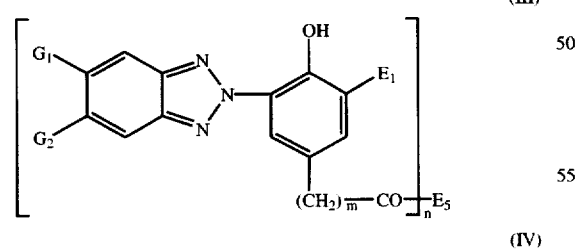

(III)

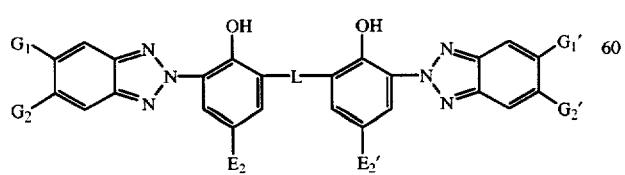

(IV)

wherein $G_1$ is hydrogen or halogen,
$G_1'$ is hydrogen or halogen,
$G_2$ is halogen, nitro, cyano, perfluoroalkyl of 1 to 12 carbon atoms, —CO—$G_3$, —COO$G_3$, —CONH$G_3$, —CON($G_3$)$_2$, $E_3$SO—, $E_3SO_2$—, —P(O)($C_6H_5$)$_2$, —CO—$G_3$, —CO—NH—$G_3$, —CO—N($G_3$)$_2$, —N($G_3$)—CO—$G_3$,

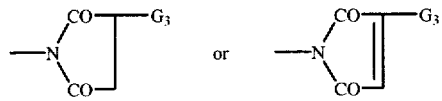

$G_2'$ has the same meaning as $G_2$,
    or in formula IV, one of $G_2$ or $G_2'$ is also hydrogen,
$G_3$ is hydrogen, straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms,
$E_1$ is hydrogen, straight or branched chain alkyl of 1 to 24 carbon atoms, straight or branched chain alkenyl of 2 to 24 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms; or $E_1$ is alkyl of 1 to 24 carbon atoms substituted by one or two hydroxy groups; or $E_1$ is a group —(CH$_2$)$_m$—CO—$X_1$—$G_3$ where $X_1$ is —O—, —NH— or —N$G_3$—,
$E_2$ is a straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by one to three alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;
$E_2'$ has the same meaning as $E_2$;
n is 1 or 2,
when n is 1, $E_5$ is OE$_6$ or NE$_7$E$_8$, or
$E_5$ is —PO(OE$_{12}$)$_2$, —OSi(E$_{11}$)$_3$ or —OCO—E$_{11}$, or straight or branched chain C$_1$–C$_{24}$alkyl which is interrupted by —O—, —S— or —NE$_{11}$ and which can be unsubstituted or substituted by —OH or —OCO—E$_{11}$, C$_5$–C$_{12}$ cycloalkyl which is unsubstituted or substituted by —OH, straight chain or branched C$_2$–C$_{18}$alkenyl which is unsubstituted or substituted by —OH, C$_7$–C$_{15}$aralkyl, —CH$_2$—CHOH—E$_{13}$ or glycidyl,
$E_6$ is hydrogen, straight or branched chain C$_1$–C$_{24}$alkyl which is unsubstituted or substituted by one or more OH, OE$_4$ or NH$_2$ groups, or —OE$_6$ is —(OCH$_2$CH$_2$)$_w$OH or —(OCH$_2$CH$_2$)$_w$OE$_{21}$ where w is 1 to 12 and $E_{21}$ is alkyl of 1 to 12 carbon atoms,
$E_7$ and $E_8$ are independently hydrogen, alkyl of 1 to 18 carbon atoms, straight or branched chain C$_3$–C$_{18}$alkyl which is interrupted by —O—, —S— or —NE₁₁—, C₅–C₁₂cycloalkyl, C₆–C₁₄aryl or C₁–C₃hydroxylalkyl, or E₇ and E₈ together with the N atom are a pyrrolidine, piperidine, piperazine or morpholine ring, E₅ is —X—(Z)$_p$—Y—E₁₅ wherein

X is —O— or —N(E₁₆)—,

Y is —O— or —N(E₁₇)—,

Z is C₂–C₁₂-alkylene, C₄–C₁₂-alkylene interrupted by one to three nitrogen atoms, oxygen atoms or a mixture thereof, or is C₃–C₁₂-alkylene, butenylene, butynylene, cyclohexylene or phenylene, each substituted by a hydroxyl group, m is zero, 1 or 2, p is 1, or p is also zero when X and Y are —N(E₁₆)— and —N(E₁₇)—, respectively, E₁₅ is a group —CO—C(E₁₈)=C(H)E₁₉ or, when Y is —N(E₁₇)—, forms together with E₁₇ a group —CO—CH=CH—CO—, wherein E₁₈ is hydrogen or methyl, and E₁₉ is hydrogen, methyl or —CO—X—E₂₀, wherein E₂₀ is hydrogen, C₁–C₁₂-alkyl or a group of the formula

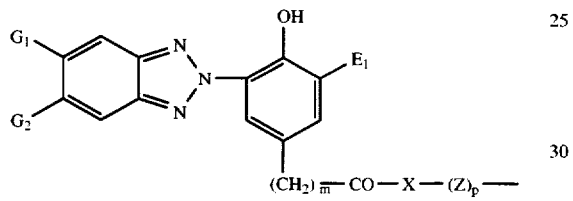

wherein the symbols E₁, G₂, X, Z, m and p have the meanings defined above, and E₁₆ and E₁₇ independently of one another are hydrogen, C₁–C₁₂-alkyl, C₃–C₁₂-alkyl interrupted by 1 to 3 oxygen atoms, or is cyclohexyl or C₇–C₁₅aralkyl, and E₁₆ together with E₁₇ in the case where Z is ethylene, also forms ethylene, when n is 2, one of G₂ can also be hydrogen, E₅ is one of divalent radicals —O—E₉—O— or —N(E₁₁)—E₁₀—N(E₁₁)—, E₉ is C₂–C₈alkylene, C₄–C₈alkenylene, C₄alkynylene, cyclohexylene, straight or branched chain C₄–C₁₀alkylene which is interrupted by —O— or by —CH₂—CHOH—CH₂—O—E₁₄—O—CH₂—CHOH—CH₂—, E₁₀ being straight or branched chain C₂–C₁₂alkylene which may be interrupted by —O—, cyclohexylene, or

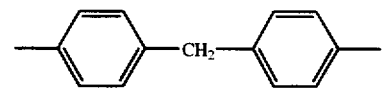

or

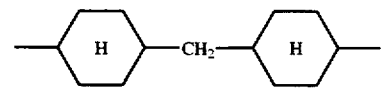

or E₁₀ and E₁₁ with the two nitrogen atoms form a piperazine ring,

E₁₄ is straight or branched chain C₂–C₈alkylene, straight or branched chain C₄–C₁₀alkylene which is interrupted by —O—, cycloalkylene, arylene or

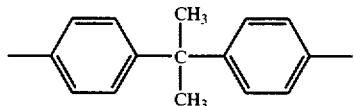

or

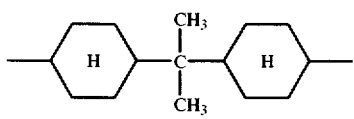

where E₇ and E₈ are independently hydrogen, alkyl of 1 to 18 carbon atoms or E₇ and E₈ together are alkylene of 4 to 6 carbon atoms, 3-oxapentamethylene, 3-iminopentamethylene or 3-methyliminopentamethylene, E₁₁ is hydrogen, straight or branched chain C₁–C₁₈alkyl, C₅–C₁₂cycloalkyl, straight or branched chain C₂–C₁₈alkenyl, C₆–C₁₄aryl or C₇–C₁₅aralkyl, E₁₂ is straight or branched chain C₁–C₁₈alkyl, straight or branched chain C₃–C₁₈alkenyl, C₅–C₁₀cycloalkyl, C₆–C₁₆aryl or C₇–C₁₅aralkyl, E₁₃ is H, straight chain or branched C₁–C₁₈alkyl which is substituted by —PO(OR₁₂)₂, phenyl which is unsubstituted or substituted by OH, C₇–C₁₅aralkyl or —CH₂OE₁₂, E₃ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms, L is alkylene of 1 to 12 carbon atoms, alkylidene of 2 to 12 carbon atoms, benzylidene, p-xylylene, α,α, α',α'-tetramethyl-m-xylylene or cycloalkylidene, and T is —SO—, —SO₂—, —SO—E—SO—, —SO₂—E—SO₂—, —CO—, —CO—CO—, —CO—CH₂—CO—, —CO—E—CO—, —COO—E—OCO— or —CO—NG₅—E—NG₅—CO—, where E is alkylene of 2 to 12 carbon atoms, cycloalkylene of 5 to 12 carbon atoms, or alkylene interrupted or terminated by cyclohexylene of 8 to 12 carbon atoms; and G₅ is G₃ or hydrogen.

2. A composition according to claim 1 wherein component (b) is a compound of formula I

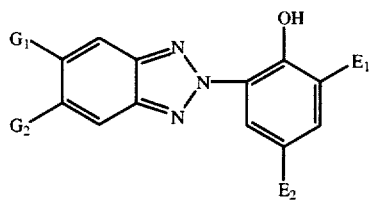

(I)

wherein

G₁ is hydrogen,

G₂ is cyano, CF₃—, chloro, fluoro, —CO—G₃ or E₃SO₂—,

G₃ is straight or branched chain alkyl of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 4 alkyl of 1 to 4 carbon atoms, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —OE$_4$, —NCO, —NH$_2$, —NHCOE$_{11}$, —NHE$_4$ or —N(E$_4$)$_2$, or mixtures thereof, where $E_4$ is straight or branched chain alkyl of 1 to 24 carbon atoms; or said alkyl or said alkenyl interrupted by one or more —O—, —NH— or —NE$_4$— groups or mixtures thereof and which can be unsubstituted or substituted by one or more —OH, —OE$_4$ or —NH$_2$ groups or mixtures thereof;

$E_3$ is alkyl of 1 to 20 carbon atoms, hydroxyalkyl of 2 to 20 carbon atoms, alkenyl of 3 to 18 carbon atoms, cycloalkyl of 5 to 12 carbon atoms, phenylalkyl of 7 to 15 carbon atoms, aryl of 6 to 10 carbon atoms or said aryl substituted by one or two alkyl of 1 to 4 carbon atoms or 1,1,2,2-tetrahydroperfluoroalkyl where the perfluoroalkyl moiety is of 6 to 16 carbon atoms; or is a compound of formula I wherein, $G_1$ is hydrogen, $G_2$ is CF$_3$—, chloro, fluoro or $E_3SO_2$—, $E_1$ is hydrogen or straight or branched alkyl of 4 to 24 carbon atoms, $E_2$ is as defined above, and $E_3$ is straight or branched chain alkyl of 1 to 7 carbon atoms.

3. A composition according to claim 1 wherein component (b) is a compound of formula IIIA

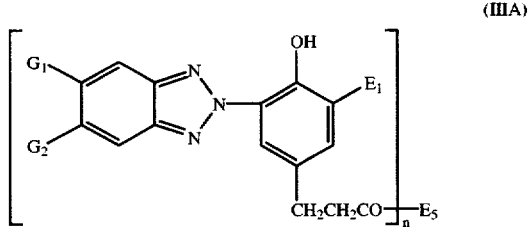

(IIIA)

wherein $G_1$ is hydrogen, $G_2$ is is CF$_3$—, chloro or fluoro, $E_1$ is hydrogen, straight or branched alkyl of 4 to 24 carbon atoms or phenylalkyl of 7 to 15 carbon atoms, $E_5$ is —OE$_6$ or —NE$_7$E$_8$, or $E_5$ is —X—(Z)$_p$—Y—E$_{15}$ wherein X is —O— or —N(E$_{16}$)—, Y is —O— or —N(E$_{17}$)—, Z is C$_2$–C$_{12}$-alkylene, C$_4$–C$_{12}$-alkylene interrupted by one to three nitrogen atoms, oxygen atoms or a mixture thereof, or is C$_3$–C$_{12}$-alkylene, butenylene, butynylene, cyclohexylene or phenylene, each substituted by a hydroxyl group, m is 0,1,2 or 3, p is 1, or p is also zero when X and Y are —N(E$_{16}$)— and —N(E$_{17}$)—, respectively, $E_{15}$ is a group —CO—C(E$_{18}$)=C(H)E$_{19}$ or, when Y is —N(E$_{17}$)—, forms together with $E_{17}$ a group —CO—CH=CH—CO—, wherein $E_{18}$ is hydrogen or methyl, and $E_{19}$ is hydrogen, methyl or —CO—X—E$_{20}$, wherein $E_{20}$ is hydrogen, C$_1$–C$_{12}$-alkyl or a group of the formula

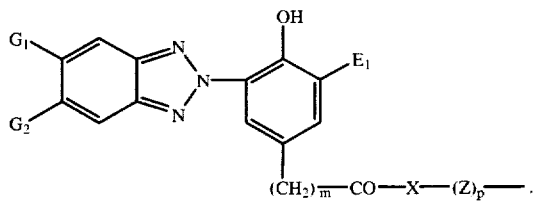

4. A composition according to claim 1 wherein component (b) is a compound of formula IV (IV)

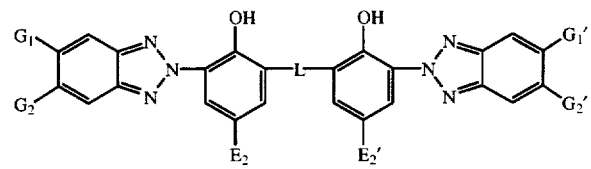

wherein $G_1$ and $G_1'$ are independently hydrogen, $G_2$ is CF$_3$— or chloro, $G_2'$ is hydrogen, CF$_3$— or chloro, $E_2$ and $E_2'$ are straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is alkylene of 1 to 12 carbon atoms, alkylidene of 2 to 12 carbon atoms, benzylidene, p-xylylene, α,α,α',α',-tetramethyl-m-xylylene or cycloalkylidene.

5. A composition according to claim 1 wherein component (b) is a compound of formula I (I)

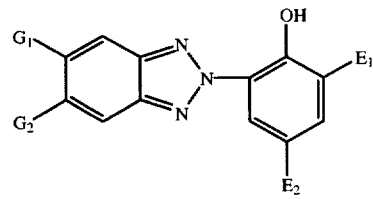

wherein $G_1$ is hydrogen, $G_2$ is CF$_3$— or chloro, $E_1$ is phenylalkyl of 7 to 15 carbon atoms, phenyl, or said phenyl or said phenylalkyl substituted on the phenyl ring by 1 to 4 alkyl of 1 to 4 carbon atoms, $E_2$ is straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; or $E_2$ is said alkyl of 1 to 24 carbon atoms or said alkenyl of 2 to 18 carbon atoms substituted by one or more —OH, —OCOE$_{11}$, —NH$_2$ or —NHCOE$_{11}$, or mixtures thereof, or said alkyl or said alkenyl interrupted by one or more —O— and which can be unsubstituted or substituted by one or more —OH, or is a compound of formula I wherein, $G_1$ is hydrogen, $G_2$ is CF$_3$— or chloro, $E_1$ is hydrogen, straight or branched alkyl of 4 to 24 carbon atoms or phenylalkyl of 7 to 15 carbon atoms, and $E_2$ is as defined above.

6. A composition according to claim 1 wherein component (b) is a compound of formula IIIA

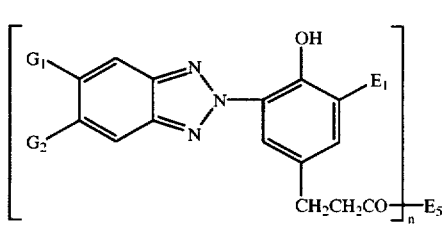

(IIIA)

wherein $G_1$ is hydrogen, $G_2$ is CF$_3$— or chloro, $E_1$ is hydrogen, straight or branched alkyl of 4 to 24 carbon atoms or phenylalkyl of 7 to 15 carbon atoms, $E_5$ is —OE$_6$ or —NE$_7$E$_8$ where $E_6$ is hydrogen, straight or branched chain C$_1$–C$_{24}$alkyl which is unsubstituted or substituted by one or more OH groups, or —OE$_6$ is —(OCH$_2$CH$_2$)$_w$OH or —(OCH$_2$CH$_2$)$_w$OE$_{21}$ where w is 1 to 12 and E$_{21}$ is alkyl of 1 to 12 carbon atoms, and $E_7$ and $E_8$ are independently hydrogen, alkyl of 1 to 18 carbon atoms, straight or branched chain C$_3$–C$_{18}$alkyl which is interrupted by —O—, —S— or —NE$_{11}$—, C$_5$–C$_{12}$cycloalkyl, C$_6$–C$_{14}$aryl or C$_1$–C$_3$hydroxylalkyl, or $E_7$ and $E_8$ together with the N atom are a pyrrolidine, piperidine, piperazine or morpholine ring.

7. A composition according to claim 1 wherein component (b) is a compound of formula IV

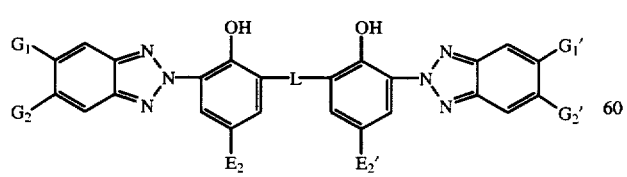

(IV)

wherein $G_1$ and $G_1'$ are hydrogen, $G_2$ is CF$_3$— or chloro, $G_2'$ is hydrogen, chloro or CF$_3$—, $E_2$ and $E_2'$ are independently straight or branched alkyl chain of 1 to 24 carbon atoms, straight or branched chain alkenyl of 2 to 18 carbon atoms, cycloalkyl of 5 to 12 carbon atoms, phenylalkyl of 7 to 15 carbon atoms, phenyl, or said phenyl or said phenylalkyl substituted on the phenyl ring by 1 to 3 alkyl of 1 to 4 carbon atoms; and L is methylene.

8. A composition according to claim 1 wherein component (b) is (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(d) 2,2'-methylene-bis[6-(5-trifluoromethyl-2H-benzotriazol-2-yl)-4-tert-octylphenol];

(e) methylene-2-[4-tert-octyl-6-(2H-benzotriazol-2-yl)phenol]2'-[4-tert-octyl-6-(5-trifluoromethyl-2H-benzotriazol-2-yl)phenol];

(f) 3-(5-trifluoromethyl-2H-benzotriazol-2-yl)-5-tert-butyl-4-hydroxyhydrocinnamic acid;

(g) methyl 3-(5-trifluoromethyl-2H-benzotriazol-2-yl)-5-tert-butyl-4-hydroxy-hydrocinnamate;

(h) isooctyl 3-(5-trifluoromethyl-2H-benzotriazol-2-yl)-5-tert-butyl-4-hydroxy-hydrocinnamate;

(i) 5-trifluoromethyl-2-[2-hydroxy-5-(3-hydroxypropyl)phenyl]-2H-benzotriazole;

(j) 5-trifluoromethyl-2-[2-hydroxy-5-(3-acryloyloxypropyl)phenyl]-2H-benzotriazole;

(k) 5-trifluoromethyl-2-[2-hydroxy-5-(3-methacryloyloxypropyl)phenyl]-2H-benzotriazole;

(l) 5-trifluoromethyl-2-[2-hydroxy-5-(3-acrylylaminopropyl)phenyl]-2H-benzotriazole;

(m) 5-trifluoromethyl-2-[2-hydroxy-5-(3-methacrylylaminopropyl)phenyl]-2H-benzotriazole;

(n) 5-trifluoromethyl-2-(2-hydroxy-3-α-cumyl-5-tert-butylphenyl)-2H-benzotriazole;

(o) 5-trifluoromethyl-2-(2-hydroxy-3-α-cumyl-5-nonylphenyl)-2H-benzotriazole;

(p) 5-trifluoromethyl-2-[2-hydroxy-3-α-cumyl-5-(2-hydroxyethyl)phenyl]-2H-benzotriazole;

(q) 5-trifluoromethyl-2-[2-hydroxy-3-α-cumyl-5-(3-hydroxypropyl)phenyl]-2H-benzotriazole;

(r) 5-trifluoromethyl-2-(2-hydroxy-3,5-ditert-amylphenyl)-2H-benzotriazole;

(s) 5-trifluoromethyl-2-(2-hydroxy-3,5-ditert-butylphenyl)-2H-benzotriazole;

(t) 5-trifluoromethyl-2-(2-hydroxy-3-dodecyl-5-methylphenyl)-2H-benzotriazole;

(u) 5-trifluoromethyl-2-[2-hydroxy-3-tert-butyl-5-(3-hydroxypropyl)phenyl]-2H-benzotriazole;

(v) 5-trifluoromethyl-2-[2-hydroxy-3-tert-butyl-5-(2-hydroxyethyl)phenyl]-2H-benzotriazole;

(w) 5-trifluoromethyl-2-[2-hydroxy-5-(2-hydroxyethyl)phenyl]-2H-benzotriazole;

(x) 5-trifluoromethyl-2-(2-hydroxy-3,5-di-α-cumylphenyl)-2H-benzotriazole;

(y) 5-fluoro-2-(2-hydroxy-3,5-di-α-cumylphenyl)-2H-benzotriazole;

(z) 5-butylsulfonyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole;

(bb) 5-butylsulfonyl-2-(2-hydroxy-3,5-di-tert-octylphenyl)-2H-benzotriazole;

(cc) 5-trifluoromethyl-2-}2-hydroxy-3-tert-butyl-5-[2-(omega-hydroxy-octa(ethyleneoxy)carbonyl)ethyl]phenyl}-2H-benzotriazole;

(dd) 5-chloro-2-(2-hydroxy-3,5-ditert-butylphenyl)-2H-benzotriazole;

(ee) 5-chloro-2-(2-hydroxy-3-tert-butyl-5-methylphenyl)-2H-benzotriazole;

(ff) octyl 3-(5-chloro-2H-benzotriazol-2-yl)-5-tert-butyl-4-hydroxyhydrocinnamate; or (gg) 5-chloro-2-(2-hydroxy-3-α-cumyl-5-tert-octylphenyl)-2H-benzotriazole.

9. A composition according to claim 1 wherein the effective amount of red-shifted benzotriazole alone or in combination with other UV absorbers and/or with an antioxidant in the candle wax is 0.01 to 10 by weight based on the wax.

10. A composition according to claim 9 wherein the effective amount of red-shifted benzotriazole in the candle wax is 0.1 to 2% by weight based on the wax.

11. A composition according to claim 10 wherein the effective amount of red-shifted benzotriazole in the candle wax is 0.1 to 0.5% by weight based on the wax.

12. A composition according to claim 1 which additionally contains another UV absorber selected from the group consisting of the conventional benzotriazoles, s-triazines, benzoates, α-cyanoacrylates, benzophenones, oxanilides, malonates and salicylates.

13. A composition according to claim 1 which additionally contains an antioxidant which is n-octadecyl 3,5-di-tert-butyl-4-hydroxyhydrocinnamate, neopentanetetrayl tetrakis(3,5-di-tert-butyl-4-hydroxyhydrocinammate), 1,3,5-tris(3,5-di-tert-butyl-4-hydroxybenzyl) isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl) isocynurate, 1,1,3,-tris(2-methyl-4-hydroxy-5-tert-butylphenyl) butane, 1,3,5-tris[2-(3,5-di-tert-butyl-4-hydroxyhydrocinnamoyloxy)ethyl] isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl) butyrate], octyl 3,5-di-tert-butyl-4-hydroxybenzylmercaptoacetate, bis(3,5-di-tert-butyl-4-hydroxyhydrocinnamoyl) hydrazide, or N,N-dialkylhydroxylamine prepared from di(hydrogenated tallow)amine by direct oxidation.

14. A composition which consists essentially of
(a) candle wax which is white and unscented; white and scented; dyed and unscented; dyed and scented; dipped and unscented; or dipped and scented, and
(b) an effective stabilizing amount of a combination of
(i) a benzotriazole of formula I, II, III or IV according to claim 1, and
(ii) a hindered amine;
wherein the ratio by weight of (i) to (ii) is from 10:1 to 1:10.

15. A composition according to claim 14 wherein the ratio by weight of (i) to (ii) is from 4:1 to 1:4.

16. A composition according to claim 15 wherein the ratio by weight of (i) to (ii) is from 2:1 to 1:2.

17. A composition according to claim 14 wherein the effective amount of red-shifted benzotriazole plus hindered amine in the candle wax is 0.01 to 10% by weight based on the wax.

18. A composition according to claim 17 wherein the effective amount of red-shifted benzotriazole plus hindered amine in the candle wax is 0.1 to 2% by weight based on the wax.

19. A composition according to claim 18 wherein the effective amount of red-shifted benzotriazole plus hindered amine in the candle wax is 0.1 to 0.5% by weight based on the wax.

20. A composition according to claim 14 wherein the hindered amine is (a) bis(2,2,6,6-tetramethylpiperidin-4-yl) sebacate, (b) bis(1,2,2,6,6-pentamethylpiperidin-4-yl) sebacate, (c) di(1,2,2,6,6-pentamethylpiperidin-4-yl) (3,5-di-tert-butyl-4-hydroxybenzyl)-butylmalonate, (d) 4-benzoyl-2,2,6,6-tetramethylpiperidine, (e) 4-stearyloxy-2,2,6,6-tetramethylpiperidine, (f) 3-n-octyl-7,7,9,9-tetramethyl-1,3,8-triaza-spiro[4.5]decane-2,4-dione, (g) tris(2,2,6,6-tetramethylpiperidin-4-yl) nitrilotriacetate, (h) 1,2-bis(2,2,6,6-tetramethyl-3-oxopiperazin-4-yl) ethane, (i) 2,2,4,4-tetramethyl-7-oxa-3,20-diaza-21-oxodispiro [5.1.11.2]heneicosane, (j) polycondensation product of 2,4-dichloro-6-tert-octylamino-s-triazine and 4,4'-hexamethylenebis(amino-2,2,6,6-tetramethylpiperidine), (k) polycondensation product of 1-(2-hydroxyethyl)-2,2,6,6-tetramethyl-4-hydroxy-piperidine and succinic acid, (l) polycondensation product of 4,4'-hexamethylenebis-(amino-2,2,6,6-tetramethylpiperidine) and 1,2-dibromoethane, (m) tetrakis(2,2,6,6-tetramethylpiperidin-4-yl) 1,2,3,4-butanetetracarboxylate, (n) tetrakis(1,2,2,6,6-pentamethylpiperidin-4-yl) 1,2,3,4-butanetetracarboxylate, (o) polycondensation product of 2,4-dichloro-6-morpholino-s-triazine and 4,4'-hexamethylenebis(amino-2,2,6,6-tetramethylpiperidine), (p) N,N',N'',N'''-tetrakis[(4,6-bis(butyl-1,2,2,6,6-pentamethylpiperidin-4-yl)-amino-s-triazin-2-yl]-1,10-diamino-4,7-diazadecane, (q) [2,2,6,6-tetramethylpiperidin-4-yl/β,β,β',β'-tetramethyl-3,9-(2,4,8,10-tetraoxa-spiro[5.5]-undecane) diethyl] 1,2,3,4-butanetetracarboxylate, (r) [1,2,2,6,6-pentamethylpiperidin-4-yl/β,β,β',β',-tetramethyl-3,9-(2,4,8,10-tetraoxaspiro[5.5]undecane) diethyl] 1,2,3,4-butanetetracarboxylate, (s) octamethylene bis(2,2,6,6-tetramethylpiperidin-4-carboxylate), (t) 4,4'-ethylenebis(2,2,6,6-tetramethylpiperazin-3-one), (u) N-2,2,6,6-tetramethylpiperidin-4-yl-n-dodecylsuccinimide, (v) N-1,2,2,6,6-pentamethylpiperidin-4-yl-n-dodecylsuccinimide, (w) N-1-acetyl-2,2,6,6-tetramethylpiperidin-4-yl-n-dodecylsuccinimide, (x) 1-acetyl-3-dodecyl-7,7,9,9-tetramethyl-1,3,8-triazaspiro[4.5]decane-2,4-dione, (y) bis(1-acetyl-2,2,6,6-tetramethylpiperidin-4-yl) sebacate, (z) 1,3,5-tris {N-cyclohexyl-N-[2-(3,3,5,5-tetramethylpiperazin-2-on-1-yl)ethyl]amino}-s-triazine, (aa) 1,3,5-tris {N-cyclohexyl-N-[2-(3,3,4,5,5-pentamethylpiperazin-2-on-1-yl)ethyl]-amino}-s-triazine, (bb) bis(2,2,6,6-tetramethylpiperidin-4-yl) glutarate.

(cc) bis(1,2,2,6,6-pentamethylpiperidin-4-yl) glutarate, (dd) bis(2,2,6,6-tetramethylpiperidin-4-yl) adipate, (ee) bis(1,2,2,6,6-pentamethylpiperidin-4-yl) adipate, (ff) bis(2,2,6,6-tetramethylpiperidin-4-yl) succinate, or (gg) bis(1,2,2,6,6-pentamethylpiperidin-4-yl) succinate.

21. A composition according to claim 14 wherein the hindered amine is (a) bis(1-octyloxy-2,2,6,6-tetramethylpiperidin-4-yl) sebacate;

(b) bis(1-cyclohexyloxy-2,2,6,6-tetramethylpiperidin-4-yl) sebacate;

(c) 1-cyclohexyloxy-2,2,6,6-tetramethyl-4-octadecylaminopiperidine;

(d) 2,4-bis[(1-cyclohexyloxy-2,2,6,6-tetramethylpiperidin-4-yl)butylamino]-6-(2-hydroxyethylamino-s-triazine;

(e) bis(1-cyclohexyloxy-2,2,6,6-tetramethylpiperidin-4-yl) adipate;

(f) the oligomeric compound which is the condensation product of 4,4'-hexamethylenebis(amino-2,2,6,6-tetramethylpiperidine) and 2,4-dichloro-6-[(1-octyloxy-2,2,6,6-tetramethylpiperidin-4-yl)butylamino]-s-triazine end-capped with 2-chloro-4,6-bis(dibutylamino)-s-triazine;

(g) the oligomeric compound which is the condensation product of 4,4'-hexamethylenebis(amino-2,2,6,6-tetramethylpiperidine) and 2,4-dichloro-6-[(1-cyclohexyloxy-2,2,6,6-tetramethylpiperidin-4-yl)butylamino]-s-triazine end-capped with 2-chloro-4,6-bis(dibutylamino)-s-triazine;

(h) 1-methoxy-4-hydroxy-2,2,6,6-tetramethylpiperidine;

(i) 1-octyloxy-4-hydroxy-2,2,6,6-tetramethylpiperidine;

(j) 1-cyclohexyloxy-4-hydroxy-2,2,6,6-tetramethylpiperidine;

(k) 1-methoxy-4-oxo-2,2,6,6-tetramethylpiperidine;

(l) 1-octyloxy-4-oxo-2,2,6,6-tetramethylpiperidine;

(m) 1-cyclohexyloxy-4-oxo-2,2,6,6-tetramethylpiperidine, (n) bis(1-heptyloxy-2,2,6,6-tetramethylpiperidin-4-yl) sebacate, (o) bis(1-nonyloxy-2,2,6,6-tetramethylpiperidin-4-yl) sebacate, (p) bis(1-dodecyloxy-2,2,6,6-tetramethylpiperidin-4-yl) sebacate, or (q) N,N',N'',N'''-tetrakis[(4,6-bis(butyl-1-octyloxy-2,2,6,6-pentamethylpiperidin-4-yl)-amino-s-triazin-2-yl]-1,10-diamino-4,7-diazadecane.

22. A composition according to claim 14 wherein the hindered amine is (a) 1-(2-hydroxy-2-methylpropoxy)-4-octadecanoyloxy-2,2,6,6-tetramethylpiperidine;

(b) 1-(2-hydroxy-2-methylpropoxy)-4-hydroxy-2,2,6,6-tetramethylpiperidine;

(c) 1-(2-hydroxy-2-methylpropoxy)-4-oxo-2,2,6,6-tetramethylpiperidine;

(d) bis(1-(2-hydroxy-2-methylpropoxy)-2,2,6,6-tetramethylpiperidin-4-yl) sebacate;

(e) bis(1-(2-hydroxy-2-methylpropoxy)-2,2,6,6-tetramethylpiperidin-4-yl) adipate;

(f) bis(1-(2-hydroxy-2-methylpropoxy)-2,2,6,6-tetramethylpiperidin-4-yl) succinate;

(g) bis(1-(2-hydroxy-2-methylpropoxy)-2,2,6,6-tetramethylpiperidin-4-yl) glutarate; or (h) 2,4-bis{N-[1-(2-hydroxy-2-methylpropoxy)-2,2,6,6-tetramethylpiperidin-4-yl]-N-butylamino}-6-(2-hydroxyethylamino)-s-triazine.

23. A composition according to claim 14 wherein the red-shifted benzotriazole is (a) 5-trifluoromethyl-2-(2-hydroxy-3-α-cumyl-5-tert-octylphenyl)-2H-benzotriazole;

(b) 5-trifluoromethyl-2-(2-hydroxy-5-tert-octylphenyl)-2H-benzotriazole;

(c) 5-trifluoromethyl-2-(2-hydroxy-3,5-di-tert-octylphenyl)-2H-benzotriazole;

(d) 2,2'-methylene-bis[6-(5-trifluoromethyl-2H-benzotriazol-2-yl)-4-tert-octyl-phenol];

(e) methylene-2-[4-tert-octyl-6-(2H-benzotriazol-2-yl) phenyl]2'-[4-tert-octyl-6-(5-trifluoromethyl-2H-benzotriazol-2-yl)phenol];

(f) 3-(5-trifluoromethyl-2H-benzotriazol-2-yl)-5-tert-butyl-4-hydroxyhydrocinnamic acid;

(g) methyl 3-(5-trifluoromethyl-2H-benzotriazol-2-yl)-5-tert-butyl-4-hydroxyhydrocinnamate;

(h) isooctyl 3-(5-trifluoromethyl-2H-benzotriazol-2-yl)-5-tert-butyl-4-hydroxyhydrocinnamate;

(i) 5-trifluoromethyl-2-[2-hydroxy-5-(3-hydroxypropyl) phenyl]-2H-benzotriazole;

(j) 5-trifluoromethyl-2-[2-hydroxy-5-(3-acryloyloxypropyl)phenyl]-2H-benzotriazole;

(k) 5-trifluoromethyl-2-[2-hydroxy-5-(3-methacryloyloxypropyl)phenyl]-2H-benzotriazole;

(l) 5-trifluoromethyl-2-[2-hydroxy-5-(3-acrylylaminopropyl)phenyl]-2H-benzotriazole;

(m) 5-trifluoromethyl-2-[2-hydroxy-5-(3-methacrylylaminopropyl)phenyl]-2H-benzotriazole;

(n) 5-trifluoromethyl-2-(2-hydroxy-3-α-cumyl-5-tert-butylphenyl)-2H-benzotriazole;

(o) 5-trifluoromethyl-2-(2-hydroxy-3-α-cumyl-5-nonylphenyl)-2H-benzotriazole;

(p) 5-trifluoromethyl-2-[2-hydroxy-3-α-cumyl-5-(2-hydroxyethyl)phenyl]-2H-benzotriazole;

(q) 5-trifluoromethyl-2-[2-hydroxy-3-α-cumyl-5-(3-hydroxypropyl)phenyl]-2H-benzotriazole;

(r) 5-trifluoromethyl-2-(2-hydroxy-3,5-ditert-amylphenyl)-2H-benzotriazole;

(s) 5-trifluoromethyl-2-(2-hydroxy-3,5-ditert-butylphenyl)-2H-benzotriazole;

(t) 5-trifluoromethyl-2-(2-hydroxy-3-dodecyl-5-methylphenyl)-2H-benzotriazole;

(u) 5-trifluoromethyl-2-[2-hydroxy-3-tert-butyl-5-(3-hydroxypropyl)phenyl)-2H-benzotriazole;

(v) 5-trifluoromethyl-2-[2-hydroxy-3-tert-butyl-5-(2-hydroxyethyl)phenyl]-2 H-benzotriazole;

(w) 5-trifluoromethyl-2-[2-hydroxy-5-(2-hydroxyethyl)phenyl]-2H-benzotriazole;

(x) 5-trifluoromethyl-2-(2-hydroxy-3,5-di-α-cumylphenyl)-2H-benzotriazole;

(y) 5-fluoro-2-(2-hydroxy-3,5-di-α-cumylphenyl)-2H-benzotriazole;

(z) 5-butylsulfonyl-2-(2-hydroxy-3,5-di-α-cumylphenyl)-2H-benzotriazole;

(aa) 5-butylsulfonyl-2-(2-hydroxy-3,5-di-tert-butylphenyl)-2H-benzotriazole;

(bb) 5-butylsulfonyl-2-(2-hydroxy-3,5-di-tert-octylphenyl)-2H-benzotriazole;

(cc) 5-trifluoromethyl-2-{2-hydroxy-3-tert-butyl-5-[2-(omega-hydroxyocta(ethyleneoxy)carbonyl)ethyl]phenyl}-2H-benzotriazole;

(dd) 5-chloro-2-(2-hydroxy-3,5-ditert-butylphenyl)-2H-benzotriazole;

(ee) 5-chloro-2-(2-hydroxy-3-tert-butyl-5-methylphenyl)-2H-benzotriazole;

(ff) octyl 3-(5-chloro-2H-benzotriazol-2-yl)-5-tert-butyl4-hydroxyhydrocinnamate; or (gg) 5-chloro-2-(2-hydroxy-3-α-cumyl-5-tert-octylphenyl)-2H-benzotriazole.

24. A composition according to claim 14 which additionally contains an antioxidant which is n-octadecyl 3,5-di-tert-butyl-4-hydroxyhydrocinnamate, neopentanetetrayl tetrakis(3,5-di-tert-butyl-4-hydroxyhydrocinammate), 1,3,5-tris(3,5-di-tert-butyl-4-hydroxybenzyl) isocyanurate, thiodiethylene bis(3,5-di-tert-butyl-4-hydroxyhydrocinnamate), 1,3,5-trimethyl-2,4,6-tris(3,5-di-tert-butyl-4-hydroxybenzyl)benzene, 3,6-dioxaoctamethylene bis(3-methyl-5-tert-butyl-4-hydroxyhydrocinnamate), 2,6-di-tert-butyl-p-cresol, 2,2'-ethylidene-bis(4,6-di-tert-butylphenol), 1,3,5-tris(2,6-dimethyl-4-tert-butyl-3-hydroxybenzyl) isocynurate, 1,1,3,-tris(2-methyl-4-hydroxy-5-tert-butylphenyl) butane, 1,3,5-tris[2-(3,5-di-tert-butyl-4-hydroxyhydrocinnamoyloxy)ethyl] isocyanurate, 3,5-di-(3,5-di-tert-butyl-4-hydroxybenzyl)mesitol, hexamethylene bis(3,5-di-tert-butyl-4-hydroxyhydrocinnamate), 1-(3,5-di-tert-butyl-4-hydroxyanilino)-3,5-di(octylthio)-s-triazine, N,N'-hexamethylene-bis(3,5-di-tert-butyl-4-hydroxyhydrocinnamamide), calcium bis(ethyl 3,5-di-tert-butyl-4-hydroxybenzylphosphonate), ethylene bis[3,3-di(3-tert-butyl-4-hydroxyphenyl) butyrate], octyl 3,5-di-tert-butyl-4-hydroxybenzylmercaptoacetate, bis(3,5-di-tert-butyl-4-hydroxyhydrocinnamoyl) hydrazide, N,N-dialkylhydroxylamine prepared from di(hydrogenated tallow)amine by direct oxidation.

* * * * *